(12) United States Patent
Jia et al.

(10) Patent No.: US 11,877,091 B2
(45) Date of Patent: Jan. 16, 2024

(54) METHOD FOR ADJUSTING POSITION OF VIDEO CHAT WINDOW AND DISPLAY DEVICE

(71) Applicant: Hisense Visual Technology Co., Ltd., Qingdao (CN)

(72) Inventors: Qiyan Jia, Qingdao (CN); Zhikui Wang, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 293 days.

(21) Appl. No.: 17/477,852

(22) Filed: Sep. 17, 2021

(65) Prior Publication Data
US 2022/0006972 A1  Jan. 6, 2022

Related U.S. Application Data

(63) Continuation of application No. PCT/CN2020/086624, filed on Apr. 24, 2020.

(30) Foreign Application Priority Data

Aug. 18, 2019 (CN) .......................... 201910761474.0

(51) Int. Cl.
*H04N 7/14* (2006.01)
*G06V 20/62* (2022.01)
*G06F 3/0482* (2013.01)

(52) U.S. Cl.
CPC ............. *H04N 7/142* (2013.01); *G06V 20/62* (2022.01); *G06F 3/0482* (2013.01)

(58) Field of Classification Search
CPC ...................................................... H04N 7/14
See application file for complete search history.

(56) References Cited

U.S. PATENT DOCUMENTS

| | | | | |
|---|---|---|---|---|
| 6,243,129 | B1* | 6/2001 | Deierling | H04N 7/148 |
| | | | | 348/E9.037 |
| 8,896,654 | B2* | 11/2014 | Gratton | H04N 21/4316 |
| | | | | 348/14.05 |
| 2014/0208356 | A1 | 7/2014 | McCarthy et al. | |
| 2020/0045095 | A1* | 2/2020 | Paxinos | H04L 65/765 |

FOREIGN PATENT DOCUMENTS

| | | |
|---|---|---|
| CN | 102132575 A | 7/2011 |
| CN | 102361494 A | 2/2012 |
| CN | 103686419 A | 3/2014 |
| CN | 105005430 A | 10/2015 |
| CN | 106462413 A | 2/2017 |

* cited by examiner

*Primary Examiner* — Olisa Anwah
(74) *Attorney, Agent, or Firm* — Workman Nydegger

(57) ABSTRACT

The disclosure provides a display device, and a method for adjusting a position of a video chat window. The method includes: when a video chat window is floating on a playing image for display, acquiring the position of the video chat window and a position of the focus when an instruction for moving a focus is received; determining, according to the position of the video chat window and the position of the focus, whether the video chat window blocks the focus; and in response to the video chat window blocking the focus, moving the video chat window from a current position to a first target position.

16 Claims, 18 Drawing Sheets

METHOD FOR ADJUSTING POSITION OF VIDEO CHAT WINDOW AND DISPLAY DEVICE

CROSS-REFERENCE TO RELATED APPLICATIONS

The application is a continuation of International Application No. PCT/CN2020/086624 filed on Apr. 24, 2020, which claims the benefit and priority of Chinese Patent Application No. 201910761474.0 filed on Aug. 18, 2019. The entire disclosures of the above applications are incorporated herein by reference.

FIELD

The present disclosure relates to display devices, in particular to a display device, and a method for adjusting a video chat window.

BACKGROUND

This section provides background information related to the present disclosure which is not necessarily prior art.

At present, a display device like a smart television may provide playing images such as audios, videos and images, so as to attract wide attention from users.

With the development of large data and artificial intelligence, there is an increasing user demand for functions of the display devices. For example, a user desires to have a video chat with at least one friend on a social platform while watching video shows, which requests the display device to display a video chat image while displaying a video show; as another example, when a user wants to use an educational application to watch educational content and also has a video chat with at least one friend on the social platform, which requests the display device to display the video chat image while displaying an interface of the educational application.

Therefore, there is a need to control or adjust a display position of a video chat window.

SUMMARY

This section provides a general summary of the disclosure, and is not a comprehensive disclosure of its full scope or all of its features.

The disclosure provides a display device and a method for adjusting a position of a video chat window.

In one aspect, the disclosure provides a display device, including:
 a display, configured to display a playing image and/or a video chat window;
 a controller, configured to:
 present the playing image;
 during a video chat with a peer device, present the video chat window above the playing image, wherein the video chat window is smaller than the playing image in size;
 upon receiving an input instruction for moving a focus, acquire a position of the video chat window and a position of the focus, and determine, according to the position of the video chat window and the position of the focus, whether the video chat window blocks the focus; and
 in response to the video chat window blocking the focus, move the video chat window to a first target position from a current position, wherein the first target position is the position where the video chat window does not block the focus.

In second aspect, the disclosure provides a display device, including:
 a display, configured to display a playing image and/or a video chat window;
 a controller, configured to:
 present the playing image;
 during a video chat with a peer device, present the video chat window above the playing image, wherein the video chat window is smaller than the playing image;
 if the playing image includes a video image where keyword information exists, acquire a position of the video chat window and a position of the keyword information, and determine, according to the position of the video chat window and position of the keyword information, whether the video chat window blocks the keyword information; and
 in response to the video chat window blocking the keyword information, move the video chat window to a second target position, wherein the second target position is a position where the video chat window does not block the keyword information.

In third aspect, the disclosure provides a method for adjusting a position of a video chat window adaptively, including:
 while a video chat window is floating on a playing image for display, monitoring whether an instruction for moving a focus is received;
 upon receiving the instruction for moving the focus, acquiring a position of the video chat window and a position of the focus;
 determining, according to the position of the video chat window and the position of the focus, whether the video chat window blocks the focus; and
 if it is determined that the video chat window blocks the focus, moving the video chat window to a first target position from a current position, wherein the first target position is the position where the video chat window does not block the focus.

In fourth aspect, the disclosure provides a method for adjusting a position of a video chat window, including:
 while the video chat window is floating on the playing image for display, in response to the playing image being a video image, detecting whether keyword information exists in a video image;
 in response to the keyword information existing in the video image, acquiring a position of the video chat window and a position of the keyword information;
 determining, according to the position of the video chat window and position of the keyword information, whether the video chat window blocks the keyword information; and
 in response to the video chat window blocking the keyword information, moving the video chat window to a second target position, wherein the second target position is a position where the video chat window does not block the keyword information.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 3:
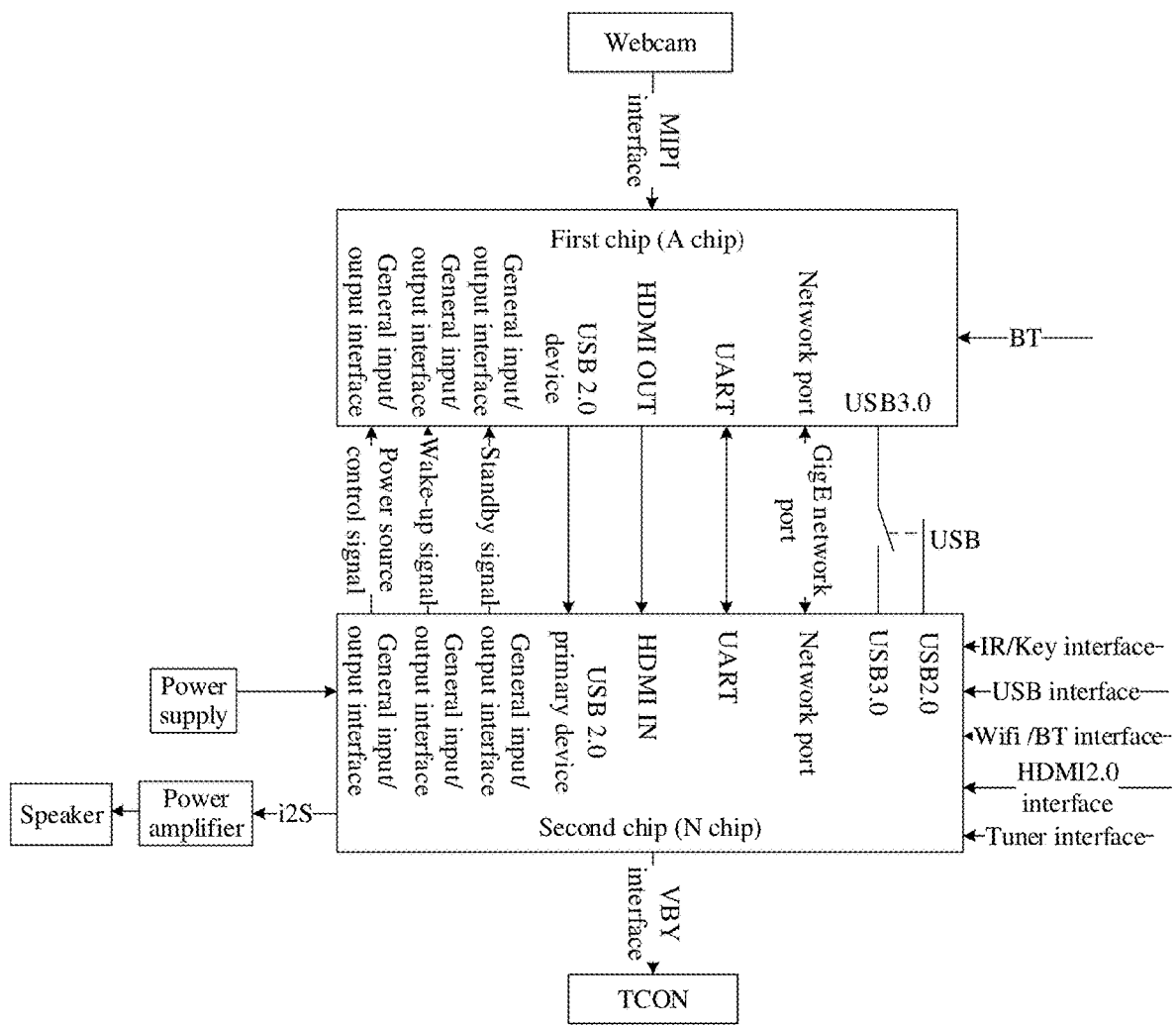
FIG. 3 illustrates a block diagram of a hardware configuration of a display device 200.
Figure 4:
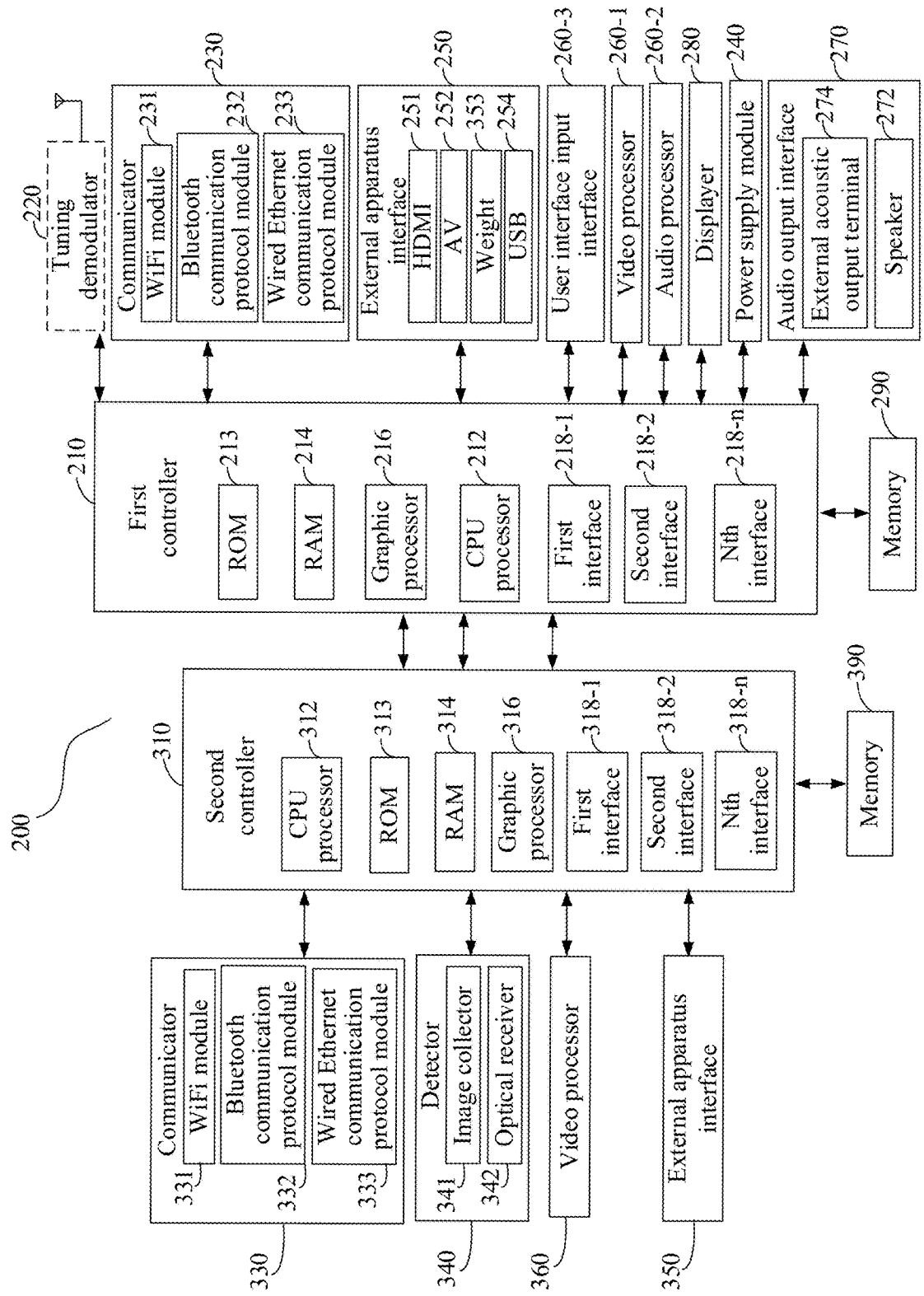
FIG. 4 illustrates a block diagram of a hardware architecture of the display device 200 in FIG. 3.
Figure 5:
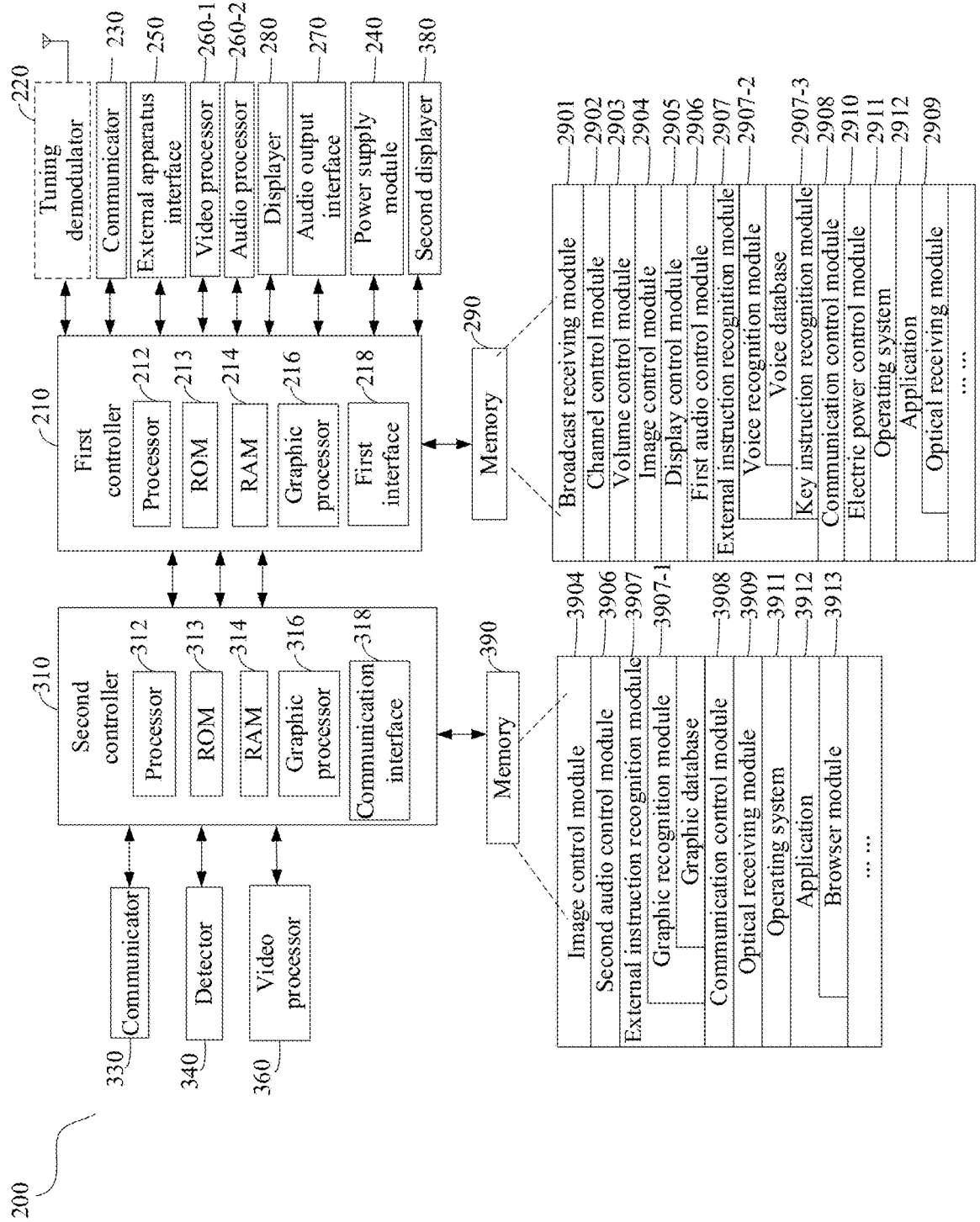
FIG. 5 illustrates a schematic diagram of a functional configuration of a display device 200.

In some embodiments, a display device according to the disclosure may be a display device having more than one chip architectures, like a display device having a dual-chip (dual hardware system) architecture illustrated in FIG. 3 to FIG. 5 of the disclosure. In other embodiments, the display device described in the disclosure may also be a display device having just one chip architecture, the implementation of the disclosure has no particular restriction on a specific architecture of the display device unless stated otherwise.

For the convenience of user, a display device usually has various external apparatus interfaces so as to connect with different external apparatuses or cables to realize corresponding functions. When an interface of the display device is connected with a high-definition webcam, data received by the webcam cannot be presented on a display screen of the display device if a hardware system of the display device does not have a hardware interface of a high-pixel webcam for receiving source codes.

The terms involved in the disclosure will be explained in combination with the drawings below. It is noted that the explanations for the terms below are intended for facilitating understanding of the content of the disclosure, and not to limit the scope of protection of the disclosure.

It should be understood that the terms "first", "second", "third" and the like in the specifications, the claims and the above drawings of the disclosure are used to distinguish similar objects, and not indicate specific sequences or orders. And it should be noted that such terms may be interchanged in an appropriate circumstance, for example, they can be implemented according to the sequence other than those given in the diagrams or descriptions of the embodiments of the disclosure.

In addition, the terms "including" and "having" and any variations thereof are intended to cover but not exclude inclusion, for example, a product or device including a series of components is not limited to those components that are clearly listed, and may include components that are not clearly listed or other components inherent in the product or device.

As used in the disclosure, the term "remote control" means a component of an electronic device (like the display device disclosed in the disclosure), and usually may wirelessly control the electronic device within a short distance. The remote control is generally connected with the electronic device through infrared and/or RF (radio frequency) signal and/or Bluetooth, and may also include function modules like WiFi, wireless USB, Bluetooth and a motion sensor. For example, a hand-held touch remote control with a user interface in a touch screen replaces most physical built-in hard keys in general remote control devices.

As used in the disclosure, the term "gesture" means a user behavior that a user moves through a change of hand shapes or hand movement for expressing an intended idea, action, purpose/or result.

Figure 1:
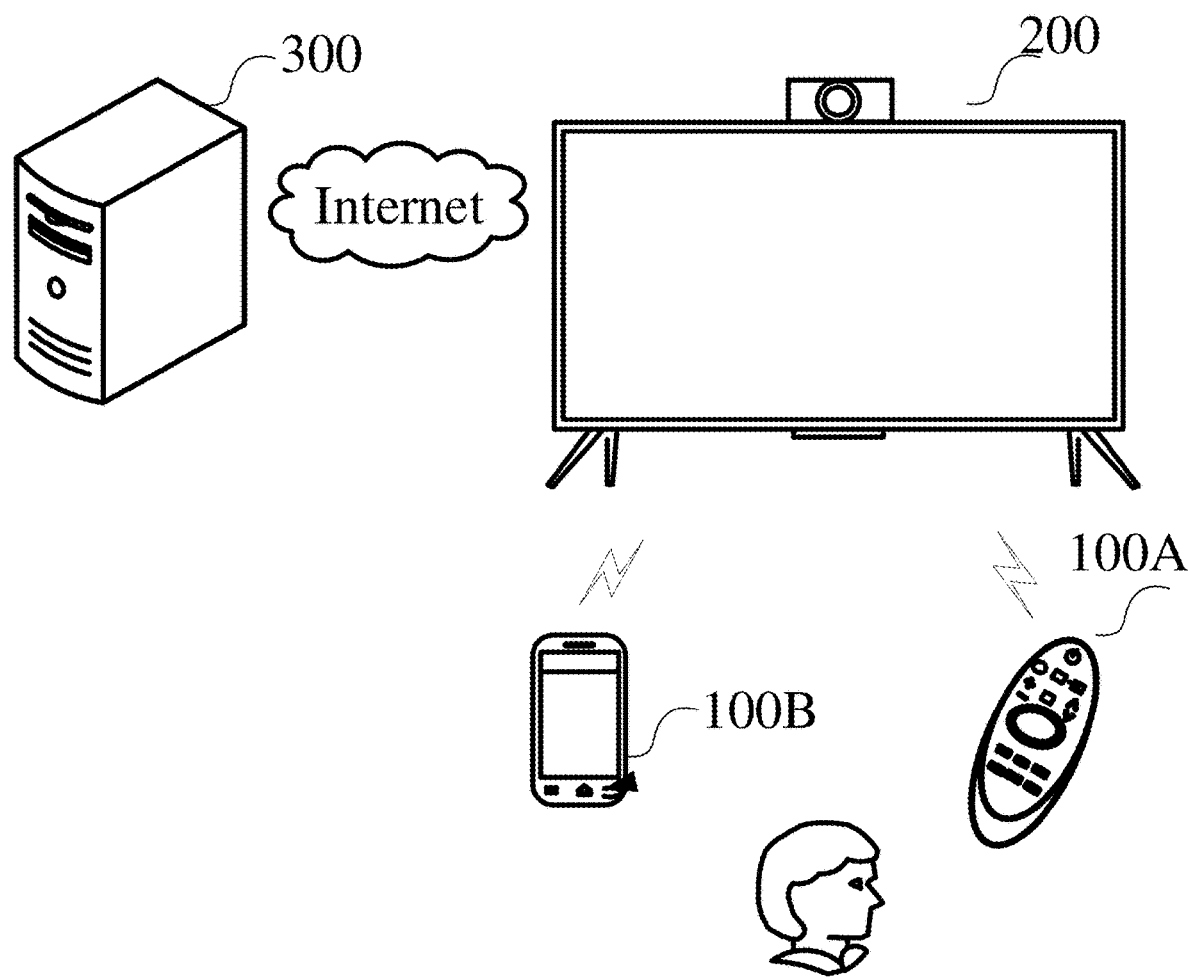
FIG. 1 illustrates a schematic diagram of an operation scenario between a display device and a control device.

FIG. 1 illustrates a schematic diagram of an operation scenario between the display device and a control device according to an embodiment. As shown in FIG. 1, the user may control the display device 200 through the control device 100.

The control device 100 may be a remote control 100A, which may communicate with the display device 200 through an infrared protocol, a Bluetooth protocol, a ZigBee protocol or other short distance communication modes, and is configured to control the display device 200 in a wireless mode or other wired modes. The user may control the display device 200 by inputting user instructions through keys on the remote control, voice input, control panel input and the like. For example, the user may input corresponding control instructions through a volume up or volume down key, a channel control key, an up/down/left/right directional key, a voice input key, a menu key, an power key and the like so as to realize a control function of the display device 200.

The control device 100 may also be a smart device, like a mobile terminal 100B, a tablet computer, a computer and a laptop, which may communicate with the display device 200 through a LAN (local area network), a WAN (wide area network), a WLAN (wireless local area network) or other networks, and controls the display device 200 through an application corresponding to the display device 200. For example, the display device 200 is controlled by the application running on the smart device. The application may provide various kinds of control for the user through a visual UI (user interface) on a screen associated with the smart device.

The "user interface" is a media interface where an application or an operating system and the user interact and exchange information, and realizes the conversion between an internal form of information and an acceptable form for the user. A GUI (Graphic User Interface) is a common form of the user interface, referring to a user interface which is displayed in a graphic form and associated with computer operations. It may comprise an interface element like an icon, a window and a control on a display of an electronic device, wherein a control may include visible interface elements like an icon, a key, a menu, a tab, a text box, a dialog box, a status bar, a navigation bar and a Widget.

For example, the mobile terminal 100B and the display device 200 both install software applications so as to realize connection communication between the mobile terminal 100B and the display device 200 through a network communication protocol, and therefore the purpose of one-to-one control operation and data communication is realized. For example, a control instruction protocol between the mobile terminal 100B and the display device 200 may be established, a remote control keyboard is synchronized to the mobile terminal 100B, and the function of the display device 200 is realized by controlling the user interface on the mobile terminal 100B; audio and video contents displayed on the mobile terminal 100B may also be transferred to the display device 200, and a synchronous display function is realized.

As shown in FIG. 1 the display device 200 may also be in data communication with a server 300 through a plurality of communication modes. In embodiments of the disclosure, the display device 200 may be allowed to be in communication connection with the server 300 through a local area network, a wireless local area network or other networks. The server 300 may provide various contents and interaction for the display device 200.

Exemplarily, the display device 200 receives update software programs or has access to a digital media library stored remotely by sending and receiving messages and interacting with EPG (Electronic Program Guide). The server 300 may be one or more group of servers, and may be one or more types of servers. The server 300 also provides other network service contents like video on demand and advertising services.

The display device 200 may be a liquid crystal display, an OLED (Organic Light Emitting Diode) display, a projection display device and a smart television. The specific type, size, resolution ratio and the like of the display device are not limited.

In addition to providing a broadcast reception television function, the display device 200 may also provide a smart network television function that a computer supports, such as a network television, a smart television, an IPTV and the like.

As shown in FIG. 1, the display device may connect with or provided with a camera, so as to present images taken by the camera on a display interface of the display device or other display device, and therefore interaction chat between users is realized. Specifically, the images taken by the camera may be displayed in full screen, half screen or displayed on any regions available for selection in the display device.

As an alternative connection, the camera is connected with a rear housing of a display through a connecting plate, and is fixedly installed on an upper middle part of the rear housing of the display. As a installation manner, the camera may be fixed on any position of the rear housing of the display to ensure that an image acquisition area of the camera is not blocked by the rear housing, for example, the capture directions of the image acquisition area and orientation of the display device are the same.

As another alternative connection, the camera is connected with the rear housing of the display through a connecting plate or other candidate connectors which allow the camera to be lifted up and lifted down. A motor is installed on the connector, the camera is lifted above the display if the user uses the camera or other applications use the camera, and the camera may be embedded into the rear housing to prevent from being damaged when not used.

As an embodiment, the camera in this disclosure may be 16 million pixels so as to realize an ultra high definition display purpose. In practical use, a camera higher or lower than the 16 million pixels may also be adopted.

After the camera is installed on the display device, the contents displayed in different application scenarios of the display device may be fused in a plurality of modes, so as to realize functions that cannot be realized by a traditional display device.

Exemplarily, the user may have a video chat with at least one other user while watching a video. The presentation of the video may serve as a background image, and a window of the video chat is displayed above the background image. Visually, this function may be called as "chatting while watching".

In other embodiments, a user may have a video chat with at least one other user while entering an educational application for study. For example, a student may be in remote interaction with a teacher while learning contents in the educational application. Visually, this function may be called as "chatting while learning".

In other embodiments, a user is having a video chat with a player in a card game while playing the game. For example, the user may be in remote interaction with other players when entering a game application to participate in the game. Visually, this function may be called as "playing while watching".

Alternatively, a game image and a video image are fused, a portrait in the video image is cut out and displayed in a game image, so as to improve user experience.

Alternatively, in motion sensing games (such as ball playing, boxing, running and dancing), human postures and movement are acquired through a camera, human detection and tracking are conducted, human key-points are detected and then are fused with animation in the games, so that the sports games scenario and dancing game scenario are realized.

In other embodiments, a user may have video and voice interaction with at least one other user when in a karaoke application. Visually, this function may be called as "singing while watching". Alternatively when the at least one user enters the application during a chat scenario, a song can be recorded together by multiple users.

In other embodiments, a user may turn on a local camera to acquire images and videos, visually, this function may be called as "looking in the mirror".

In other embodiments, more functions may be added or the above functions may be reduced. The disclosure does not have specific restrictions on the functions of the display device.

Figure 2:
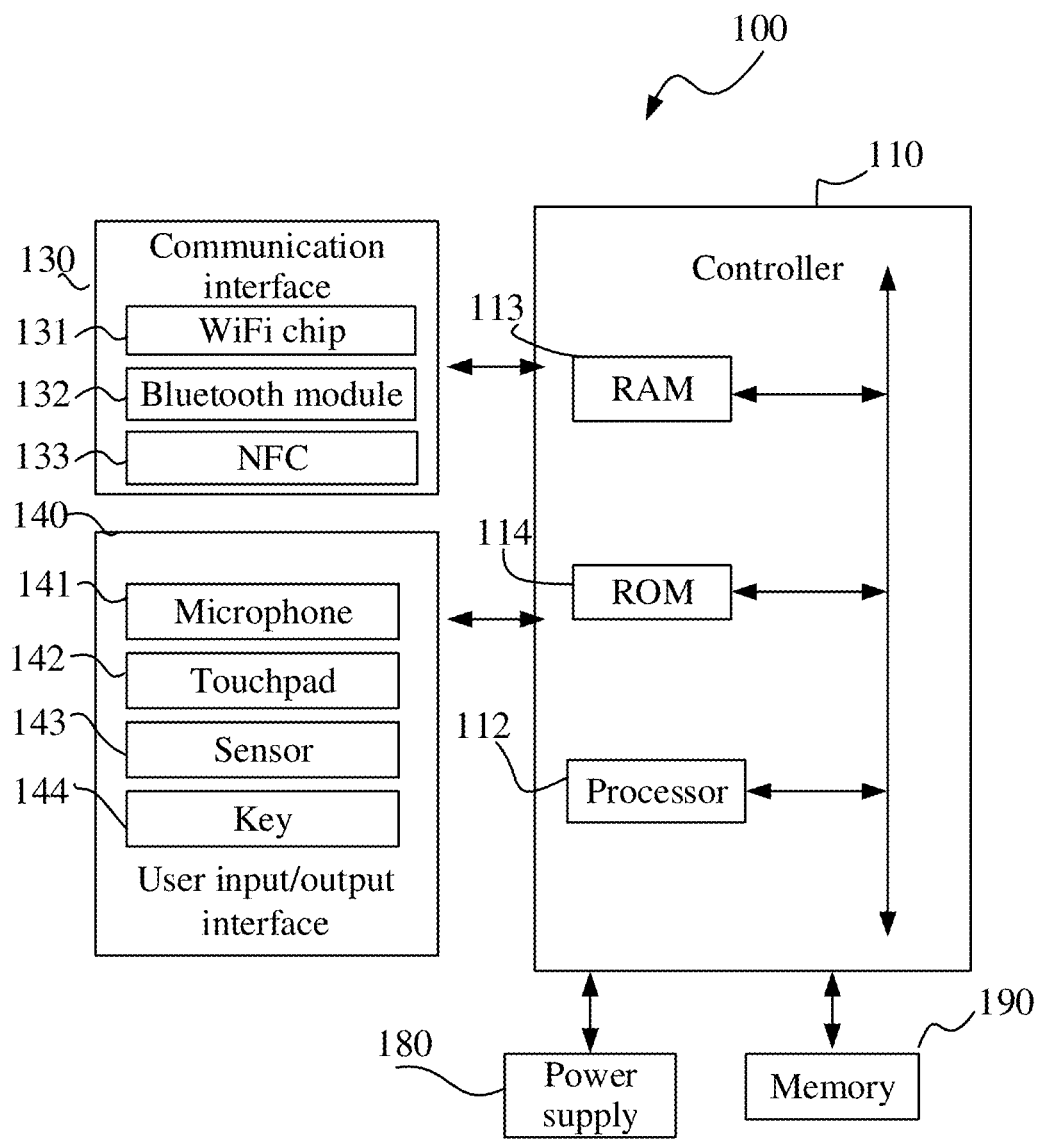
FIG. 2 illustrates a block diagram of a hardware configuration of a control device 100.

FIG. 2 illustrates a configuration block diagram of a control device 100 according to an example embodiment. As shown in FIG. 2, the control device 100 includes a controller 110, a communicator 130, a user input/output interface 140, a memory 190 and a power supply 180.

The control device 100 is configured to control the display device 200, receive an input operation instruction from a user, and convert the operation instruction into an instruction which can be recognized and responded by the display device 200, so as to play an interaction and intermediary role between the user and the display device 200. For example, a user operates a channel up or channel down key on the control device 100, and the display device 200 performs channel adding and subtracting in response.

In some embodiments, the control device 100 may be a smart device. For example, the control device 100 may be provided with various applications for the display device 200 according to user's needs.

In some embodiments, as shown in FIG. 1, a mobile terminal 100B or other smart electronic devices may realize a similar function of the control device 100 after being provided with applications for controlling the display device 200. For example, a user may install the applications to realize the function of physical keys on the control device 100 through various functional keys or virtual buttons on a graphic user interface provided on the mobile terminal 100B or other smart electronic devices.

The controller 110 includes a processor 112, an RAM113, an ROM114, a communication interface and a communication bus. The controller 110 is configured to control running and operation of the control device 100, communication collaboration between all internal components and external and internal data processing functions.

The communicator 130 realizes communication of a control signal and a data signal with the display device 200 under control of the controller 110. For example, a user input signal is sent to the display device 200. The communicator 130 may include at least one of communication modules of a WIFI module 131, a Bluetooth module 132 and an NFC module 133.

The user input/output interface 140, wherein the input interface includes at least one of input interfaces of a microphone 141, a touchpad 142, a sensor 143 and a key 144. For example, the user may realize a user instruction input function through voice, touch, gesture, pressing and the like, the input interface converts a analog signal into a digital signal and converts the digital signal into a corresponding instruction signal, so as to send the instruction signal to the display device 200.

The output interface includes interfaces for sending a user command to the display device 200. In some embodiments, the interface may be an infrared interface and a radio frequency interface. For example, when it is an infrared signal interface, the user input command needs to be converted into an infrared control signal according to an infrared control protocol and then is sent to the display device 200 via an infrared sending module. For another example, when it is a radio frequency signal interface, the user input command needs to be converted into a digital signal, then is modulated according to a radio frequency control signal modulation protocol, and sent to the display device 200 via a radio frequency sending module.

In some embodiments, the control device 100 may include at least one of the communicator 130 and the output interface. The communicator 130, like a WIFI module, a Bluetooth module and an NFC module, etc., is configured in the control device 100, so that the user input command may be coded through a WIFI protocol, or a Bluetooth protocol, or an NFC protocol and then sent to the display device 200.

The memory 190 is configured to store drives and control various running applications, data and applications of the control device 100 under control of the controller 110. The memory 190 may store various kinds control signals input from a user.

The power supply 180 is configured to provide power support to all components of the control device 100 under the control of the controller 110, and may be a battery and a related control circuit.

In some embodiments, as shown in FIG. 3 to FIG. 5, a block diagram of hardware configuration of a hardware system in the display device 200 with dual-chip is given.

When a dual-hardware architecture is adopted, the relationship of hardware systems is shown in the FIG. 3. For convenience of description, one hardware system in the dual-hardware architecture is called as a first hardware system or an A system, an A chip, and the other hardware system is called as a second hardware system or an N system, an N chip. The A chip includes a controller and various interfaces of the A chip, the N chip includes a controller and various interfaces of the N chip. The A chip and the N chip may be respectively provided with an independent operating system, so that two subsystems independent and related exist in the display device 200.

In some embodiments, the N chip may also be called as a first chip, a first controller, and the A chip may also be called as a second chip, a second controller.

As shown in FIG. 3, the A chip and the N chip may realize connection, communication and power supply through multiple different types of interfaces. The interfaces between the A chip and the N chip may include a GPIO (general-purpose input/output) interface, a USB interface, an HDMI interface, a UART interface and the like. The A chip and the N chip may be in communication or conduct power transmission through one or more of these interfaces. As shown in FIG. 3, under the dual-hardware architecture, an external power supply may supply power to the N chip, and the N chip instead of an external power supply may supply power to the A chip.

In addition to the interface for connecting with the N chip, the A chip may also include an interface configured to connect with other devices or components, like an MIPI interface, a Bluetooth interface and the like configured to connect with the camera as shown in FIG. 3.

Similarly, in addition to the interface for connecting with the N chip, the N chip may also include a VBY interface configured to connect with a display TCON (Timer Control Register), an i2S interface configured to connect with an AMP (Amplifier) and a speaker, an IR/Key interface, a USB interface, a Wifi interface, a Bluetooth interface, an HDMI interface, a Tuner interface and the like.

A dual-chip architecture is further discussed in combination with FIG. 4 below. It should be noted that FIG. 4 merely illustrates a dual-hardware architecture in the disclosure, and is not intended to limit the disclosure. In practical applications, the hardware system may include more or less hardware or interfaces if necessary.

FIG. 4 illustrates a block diagram of a hardware architecture of the display device 200 according to FIG. 3. As shown in FIG. 4, the hardware systems of the display device 200 may include the A chip, the N chip, and modules connected with the A chip or the N chip through various interfaces.

The N chip may include a tuning demodulator 220, a communicator 230, an external apparatus interface 250, a controller 210, a memory 290, a user input interface, a video processor 260-1, an audio processor 260-2, a display 280, an audio output interface 270 and a power supply. In other embodiments, the N chip may also include more or less modules.

In example embodiments, the tuning demodulator 220 may also be in an external apparatus, like an external set-top box. Thus, the set-top box outputs a TV audio and video signal after modulation and demodulation, and the signal is input into the display device 200 via the external apparatus interface 250.

The communicator 230 is a component in communication with an external apparatus or an external server according to various communication protocol types. For example, the communicator 230 may include a WIFI module 231, a Bluetooth communication protocol module 232, a wired Ethernet communication protocol module 233, and an infrared communication protocol module and other network communication protocol modules or near-field communication protocol modules.

The display device 200 may be in control signal and data signal connection with an external control device or a content providing device through the communicator 230. For example, the communicator may receive a control signal from a remote control 100A.

The external apparatus interface 250 is a component for providing data transmission for the N chip controller 210, the A chip and other external apparatuses. The external apparatus interface may connect with the external apparatuses such as the set-top box, a game device and a laptop, and may receive data from the external apparatuses, like video signals (such as dynamic images), audio signals (such as music) and additional information (such as EPG).

The external apparatus interface 250 may include any one or more of HDMI (High-Definition Multimedia Interface) interface 251, a CVBS (Composite Video Blanking Synchronization) interface 252, an analog or digital component interface 253, a USB (Universal Serial Bus) interface 254 and a RGB (Red Green Blue) interface (not shown in the drawings). The disclosure has no restriction on number and type of the external apparatus interfaces.

The controller 210 controls working of the display device 200 and responds to operation from a user by running various software applications (such as an operating system and/or various applications) stored in the memory 290.

As shown in FIG. 4, the controller 210 includes an RAM 214, an ROM 213, a graphics processor 216, a CPU processor 212, a communication interface 218 and a communication bus. The RAM 214, the ROM 213, the graphics processor 216, the CPU processor 212 and the communication interface 218 are connected through a bus.

In some example embodiments, the CPU processor 212 may include a plurality of processors. The plurality of processors may include one main processor and a plurality of sub-processors or one sub-processor. The main processor is configured to execute some operations of the display device 200, and/or execute an operation of displaying images. The plurality of sub-processors or the one sub-processor is configured to execute an operation in a standby mode and the like.

The communication interfaces may include a first interface 218-1 to a nth interface 218-n. These interfaces may be network interfaces connected to the external apparatuses via a network.

The controller 210 may control overall operation of the display device 200. For example, the controller 210 may execute an operation related to the objects selected by a user command.

The memory 290 includes various software modules configured to drive and control the display device 200, for example, the various software modules stored in the memory 290 include a basic module, a detection module, a communication module, a display control module, a browser module, various service modules and the like.

For example, a voice recognition module includes a voice decoding module and a voice instruction database module. The display control module is configured to control the display 280 to display image contents, and may be configured to play information like multimedia image contents and a UI interface. The communication module is configured to perform control and data communication with the external apparatuses. The browser module is configured to perform data communication between browser servers. The service modules are configured to provide various services and various applications.

Meanwhile, the memory 290 is further configured to store and receive external data, user data, images of all objects in various user interfaces, visual effect images of focus objects and the like.

The user input interface is configured to send a user input signal to the controller 210, or send a signal output from the controller to the user.

In some embodiments, a user may input a user instruction on a GUI (graphic user interface) displayed on the display 280, and the user input interface receives the user input command through the GUI. Alternatively, the user may input a user command by inputting a specific sound or gesture, and the user input interface recognizes the sound or gesture through a sensor to receive the user input instruction.

The video processor 260-1 is configured to receive a video signal, and, according to a standard codec protocol of an input signal, perform video data processing to obtain the video signal to display on the display 280.

Exemplarily, the video processor 260-1 includes a demultiplexing module, a video decoding module, an image synthesis module, a frame rate conversion module, a display formatting module, and the like.

The display 280 is configured to receive image signals input from the video processor 260-1, to display video content and images and a menu control interface. The display 280 includes a display component for presenting images and a driving component for driving image display. The displayed video content may be from a video in a broadcast signal received by the tuning demodulator 220, or from video content input from the communicator or the external apparatus interface. The display 220 simultaneously displays a user control interface UI generated in the display device 200 and configured to control the display device 200.

Moreover, depending on types of the display 280, it also includes a driving component for driving display. Alternatively, if the display 280 is a projection display, it may also include a projection apparatus and a projection screen.

The audio processor 260-2 is configured to receive an audio signal, and, according to a standard code protocol of an input signal, perform decompression and decoding, as well as audio data processing such as noise reduction, digital-to-analog conversion, and amplification processing, so as to obtain an audio signal for play in the speaker 272.

The audio output interface 270 is configured to receive audio signals output from the audio processor 260-2 under control of the controller 210. The audio output interface may include the speaker 272 or be output to the external audio output terminal 274.

In some other example embodiments, the video processor 260-1 may include one or a plurality of chips. The audio processor 260-2 may also include one or a plurality of chips.

Moreover, in some other exemplary embodiments, the video processor 260-1 and the audio processor 260-2 may be separate chips, or may be integrated with the controller 210 in one or a plurality of chips.

The power supply is configured to provide power support for the display device 200 with power input from an external power under control of the controller 210. The power supply may include a built-in power supply circuit installed inside the display device 200, or may be a power supply installed outside the display device 200, such as a power interface in the display device 200 for providing external power.

Similar to the N chip, as shown in FIG. 4, the A chip may include a controller 310, a communicator 330, a detector 340, and a memory 390. In some embodiments, it may also include a user input interface, a video processor, an audio processor, a display, and an audio output interface. In some embodiments, there may also be a power supply that independently powers the A chip.

The communicator 330 is a component for communicating with external apparatuses or external servers according to various communication protocol types. For example, the communicator 330 may include a WiFi module 331, a Bluetooth communication protocol module 332, a wired Ethernet communication protocol module 333, and an infrared communication protocol module and other network communication protocol modules or near field communication protocol modules.

The communicator 330 of the A chip and the communicator 230 of the N chip also interact with each other. For example, the WiFi module 231 of the N chip is configured to connect to an external network and be in network communication with an external server and the like. The WiFi module 331 of the A chip is configured to connect to the WiFi module 231 of the N chip, and does not directly connect to an external network or the like. Therefore, for a user, the display device as in the above-mentioned embodiment may display one WiFi account to the outside.

The detector 340 is a component used by the A chip of the display device to collect signals from an external environment or interact with the outside. The detector 340 may include an optical receiver 342 and a sensor configured to collect intensity of ambient light, which may self-adapt to display parameter changes by collecting the ambient light, etc.; it may also include an image collector 341, such as a camera and a webcam, which may be configured to collect an external environment scene as well as be configured to collect a user's attributes or interact gestures with the user, may self-adapt to the display parameter changes, and may also recognize the user's gestures to realize interaction with the user.

An external apparatus interface 350 is a component for providing data transmission between the controller 310 and the N chip or other external apparatus. The external apparatus interface may connect to external apparatuses such as set-top boxes, game apparatuses and laptops in a wired/wireless manner.

The controller 310 controls the work of the display device 200 and responds to user operations by running various software applications (such as installed third-party applications) stored on the memory 390 and interacting with the N chip.

As shown in FIG. 4, the controller 310 includes a read-only memory ROM 313, a random access memory RAM 314, a graphic processor 316, a CPU processor 312, a communication interface 318, and a communication bus. Among them, the ROM 313 and the RAM 314, the graphic processor 316, the CPU processor 312, and the communication interface 318 are connected through a bus.

The communication interface may include a first interface 318-1 to an nth interface 318-n. These interfaces may be network interfaces connected to the external apparatuses via the network, or network interfaces connected to the N chip via a network.

The controller 310 may control overall operation of the display device 200. For example, in response to receiving a user command for selecting a UI object displayed on the display 280, the controller 210 may perform an operation related to the object selected by the user command.

Both the graphic processor 316 of the A chip and the graphic processor 216 of the N chip can generate the various graphic objects. Their difference lies in that if an application 1 is installed in the A chip and an application 2 is installed in the N chip, when the user is in an interface of the application 1 and the user inputs a command in the application 1, a graphic object is generated by the graphic processor 316 of the A chip. When the user is in an interface of the application 2 and the user inputs a command in the application 2, the graphic processor 216 of the N chip generates the graphic object.

FIG. 5 is a schematic diagram of a functional configuration of a display device according to some embodiments of the disclosure.

As shown in FIG. 5, the memory 390 of the A chip and the memory 290 of the N chip are respectively configured to store operating systems, applications, content, and user data, etc., and under control of the controller 310 of the A chip and the controller 210 of the N chip, drive the system operation of the display device 200 and respond to various operations from a user. The memory 390 of the A chip and the memory 290 of the N chip may include volatile and/or nonvolatile memories.

For the N chip, the memory 290 is specifically configured to store operating programs for driving the controller 210 in the display device 200, and store various applications built in the display device 200, various applications downloaded by the user from an external apparatus, various graphic user interfaces related to the applications, various objects related to the graphic user interfaces, user data information, and various internal data supporting the applications. The memory 290 is configured to store system software such as an OS (operating system) kernel, middleware, and applications, and to store input video data and audio data as well as other user data.

The memory 290 is specifically configured to store driver programs such as the video processor 260-1 and the audio processor 260-2, the display 280, the communication interface 230, the tuning demodulator 220, and the input/output interface, and related data.

Exemplarily, the memory 290 includes a broadcast receiving module 2901, a channel control module 2902, a volume control module 2903, an image control module 2904, a display control module 2905, an audio control module 2906, an external instruction recognition module 2907, a communication control module 2908, an electric power control module 2910, an operating system 2911 and other application programs 2912, an interface layout management module 2913, an event transmission system 2914, a browser module and so on. The controller 210 runs various software applications in the memory 290 to execute various functions such as: a broadcast and television signal reception and demodulation function, a TV channel selection function, a volume selection function, an image control function, a display control function, an audio control function, an external instruction recognition function, a communication control function, an optical signal receiving function, a power control function, a software control platform supporting various functions, and a browser function. The memory 390 includes storing various software modules configured to drive and control the display device 200. For example, various software modules stored in the memory 390 include: a basic module, a detection module, a communication module, a display control module, a browser module, and various service modules. Since the functions of the memory 390 and the memory 290 are relatively similar, please refer to the memory 290 for related parts, and repetition will not be made here.

Exemplarily, the memory 390 includes an image control module 3904, an audio control module 3906, an external instruction recognition module 3907, a communication control module 3908, an optical receiving module 3909, an operating system 3911, other applications 3912, a browser module, and so on. The controller 210 runs various software applications in the memory 290 to execute various functions such as: an image control function, a display control function, an audio control function, an external instruction recognition function, a communication control function, an optical signal receiving function, a power control function, a software control platform supporting various functions, and a browser function. Their difference lies in that an external instruction recognition module 2907 of the N chip and the external instruction recognition module 3907 of the A chip may recognize different instructions.

Exemplarily, because an image receiving device such as the camera is connected to the A chip, the external instruction recognition module 3907 of the A chip may include a graphic recognition module 3907-1. The graphic recognition module 3907-1 stores a graphic database. When the camera receives an external command, a correspondence relationship is made with instructions in the graphic database, so instruction control is performed over the display device. Since a voice receiving device and the remote control are connected to the N chip, the external instruction recognition module 2907 of the N chip may include a voice recognition module 2907-2. The voice recognition module 2907-2 stores a voice database. When the voice receiving device receives a voice command from outside, a correspondence relation is made with instructions in the voice database, so instruction control is performed over the display device. Similarly, the control device 100 such as the remote control is connected to the N chip, and a key instruction recognition module interacts with the control device 100.

In some embodiments, there may be no distinction between a first chip and a second chip. The controller of the display device is an operating system at a software level, and built-in applications may be the same as those in the above-mentioned dual-chip architecture display device. All the above interfaces are arranged as well.

Figure 6A:
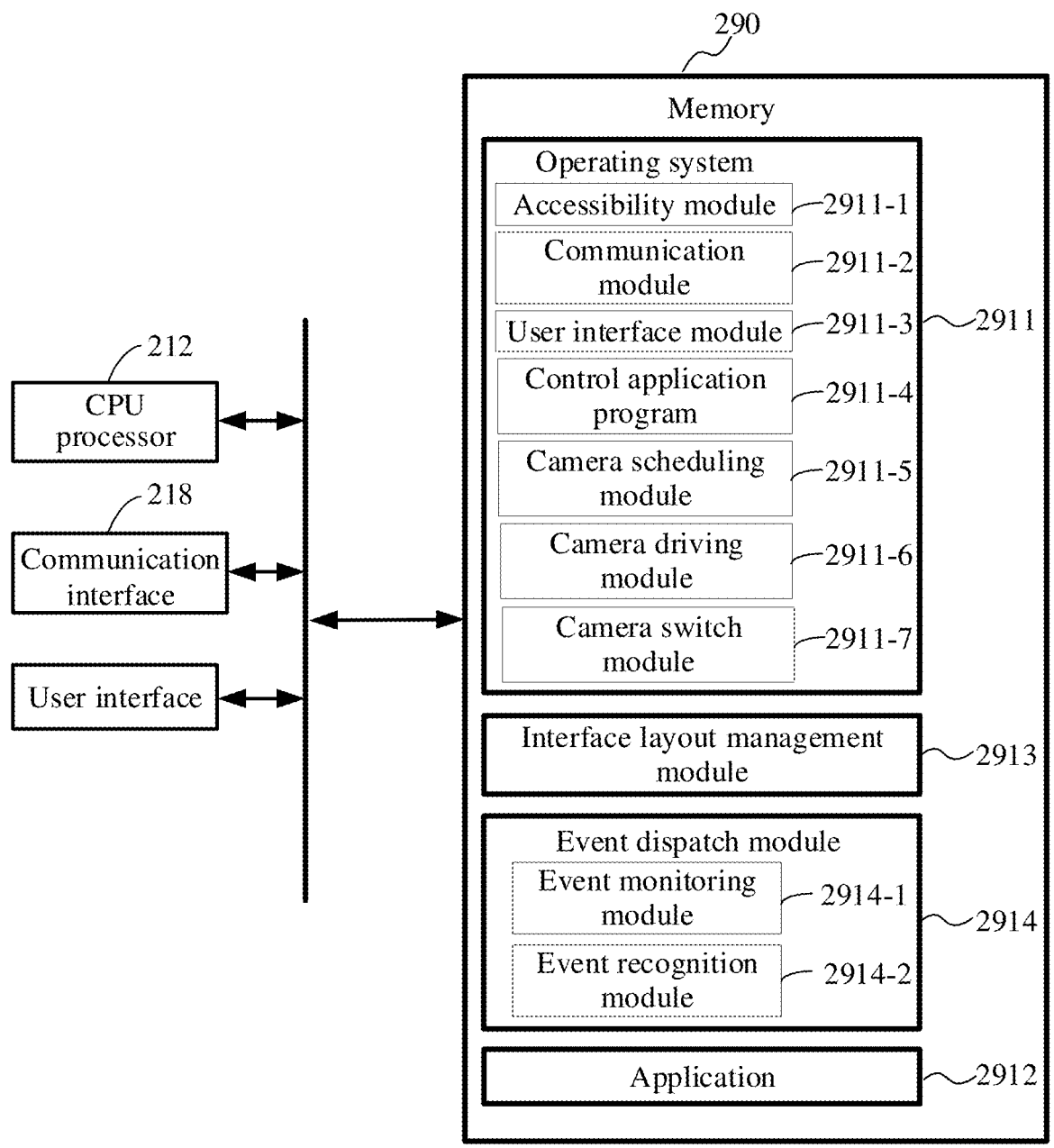
FIG. 6A illustrates a schematic diagram of a software configuration in a display device 200.

FIG. 6A illustrates a configuration block diagram of a software system in the display device 200 according to some embodiments.

For the N chip, as shown in FIG. 6A, the operating system 2911 includes operating software for processing various basic system services and for implementing hardware-related tasks, acting as a medium for data processing between applications and hardware components.

In some embodiments, a part of operating system kernels may include a series of software to manage hardware resources of the display device and provide services for other applications or software codes.

In some other embodiments, a part of the operating system kernels may include one or a plurality of device drivers. The device driver may be a set of software codes in the operating system to help operate or control a device or hardware associated with the display device. The drive may contain codes to operate video, audio, and/or other multimedia components. Exemplarily, the device drivers include displays, cameras, Flash, WiFi, and audio drivers.

As shown in FIG. 6A, in some embodiments, the operating system 2911 may specifically include: an accessibility module 2911-1, a communication module 2911-2, a user interface module 2911-3, and a control application program 2911-4.

In some embodiments, the operating system 2911 may further include: a camera scheduling module 2911-5, a camera driving module 2911-6, and a camera switch module 2911-7.

Among them, the accessibility module 2911-1 is configured to modify or access the application to realize access of the application and operation of its display content.

The communication module 2911-2 is configured to connect with other peripherals via related communication interfaces and communication networks.

The user interface module 2911-3 is configured to provide objects that display on user interfaces for access by various applications, and may use for user operation.

The control application 2911-4 is configured to control process management and foreground switching applications, including runtime applications.

The camera scheduling module 2911-5 is configured to control the camera to be turned on or off, and to raise or lower the camera.

The camera driving module 2911-6 is configured to drive a motor mechanically connected with the camera to raise or lower the camera under control of the camera scheduling module 2911-5.

The camera switch module 2911-7 is configured to turn on the camera under the control of the camera scheduling module 2911-5, i.e. enabling it to enter in an on state, or turn off the camera, i.e. enabling it to enter in an off state.

As shown in FIG. 6A, in some embodiments, event dispatch system 2914 may be realized in the operating system 2911 or in the application 2912. In some embodiments, it is realized in the operating system 2911 on the one hand, and realized in the application 2912 at the same time, is configured to monitor various user-input events, respond to recognition results of various events or sub-events according to various event references, and implement one or more sets of pre-defined operation procedures.

In particular, the event dispatch system 2914 may include an event monitor module 2914-1 and an event recognition module 2914-2. Among them, the event monitor module 2914-1 is configured to monitor the events or sub-events input from the user input interfaces.

The event recognition module 2914-2 is configured to input various events to various user input interfaces, recognize the various events or sub-events, and send them for processing to perform corresponding one or more sets of programs.

It is noted that an event or sub-event refers to input detected by one or more sensors in the display device 200 and input from an external control device, such as the control device 100.

The interface layout management module 2913 directly or indirectly receives various user input events or sub-events monitored by the event dispatch system 2914, and is configured to update a layout of the user interface, including but not limited to a position of each control or sub-control on the interface, a size, position, level, etc. of a container, and other operations related to the interface layout.

Since functions of the operating system 3911 of the A chip and the operating system 2911 of the N chip are relatively similar, related details may refer to the operating system 2911.

Figure 6B:
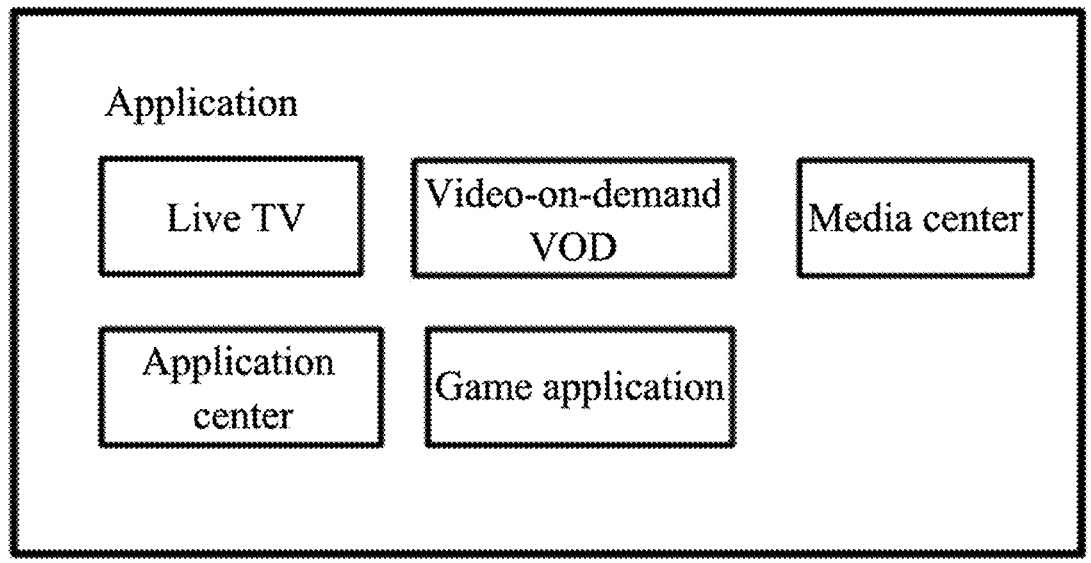
FIG. 6B illustrates a configuration schematic diagram of an application in a display device 200.

As shown in FIG. 6B, an application layer of the display device includes various applications that may be executed on the display device 200.

An application layer 2912 of the N chip may include, but not limited to, one or more applications, such as: a video-on-demand application, an application center, a game application, and so on. An application layer 3912 of the A chip may include, but not limited to, one or more applications, such as a live TV application, a media center application, and so on. It should be noted that the applications included on the A chip and the N chip are determined according to the operating system and other designs. The disclosure does not intend to limit and divide the applications on the A chip and the N chip.

The application center may provide storage of various applications. The applications may be a game, an application, or some other applications that are related to a computer system or other devices but may be run on the display device. The application center may obtain these applications from different sources, store them in a local memory, and then run them on the display device 200.

In some embodiments, since independent operating systems may be installed on the A chip and the N chip respectively, there are two independent but interrelated subsystems in the display device 200. For example, both Android and various APPs may be independently installed on the A chip and the N chip, so that each chip may realize a certain function, and the A chip and the N chip may cooperate to realize a certain function.

Figure 7A:
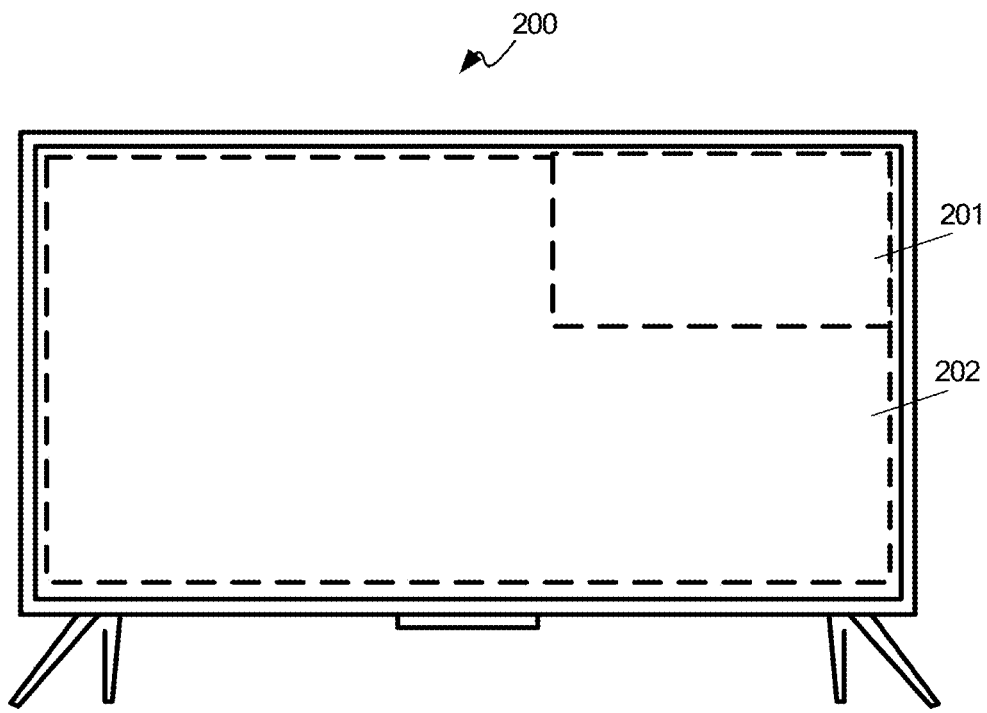
FIG. 7A illustrates a schematic diagram of a user interface of a display device 200.

FIG. 7A illustrates a schematic diagram of a user interface in a display device 200 according to an example embodiment. As shown in FIG. 7, the user interface includes a plurality of view display regions, for example, a first view display region 201 and a playing image 202, where the playing image includes layout of one or more different items. The user interface also includes a selector for indicating a selected item, and a position of the selector may be moved through user input to change selection for different items.

It should be noted that the multiple view display regions may present display images with different priorities. For example, a first view display region may present video chat item content, and a second view display region may present application layer item content (such as a webpage video, VOD display and an application image).

Alternatively, there are priorities for the presentation of different view display regions, and display priorities of the view display regions are different among view display regions with different priorities. For example, a priority of a system layer is higher than the priority of an application layer. When a user uses a selector and image switch in the application layer, image display in a view display region of the system layer is not blocked; and when a size and a position of the view display region of the application layer is changed according to a user's choice, a size and a position of the view display region of the system layer will not be affected.

Images with a same display priority may also be presented. In this case, a selector may switch between the first view display region and the second view display region, and when a size and a position of the first view display region change, a size and a position of the second view display region may be changed accordingly.

In some embodiments, any region in FIG. 7 may display an image obtained from the camera.

An "item" refers to visual objects displayed in each view display region of the user interface of the display device 200 to represent content such as icons, thumbnails, and video clips. For example: an item may represent image content or a video clip of a movie or a TV series, audio content of music, an application, or other user access history information.

In some embodiments, the "item" may display image thumbnails. For example, when the item is movies or TV series, the item may be displayed as a poster of the movie or the TV series. If the item is music, a poster of a music album may be displayed. If the item is an application, it may be displayed as an icon of the application, or a content screenshot of the application captured when the application is running most recently. If the item is a user's access history, it may be displayed as a content screenshot in a recent launch. The "item" may be displayed as a video clip. For example, the item is a dynamic image from a video clip in a trailer of the TV series.

In addition, the item may indicate an interface or a set of interfaces for connecting the display device 200 and an external apparatus, or may indicate name of the external apparatus connected to the display device, such as: a set of signal source interface, an HDMI interface, a USB interface, or a PC terminal interface, etc.

Before further discuss implementations of a method of the disclosure, scenarios of the method of the disclosure will be introduced first.

When a camera is installed on the display device, the content shown on the display device in different scenarios may be merged in many different ways, so as to achieve functions that cannot be achieved by traditional display devices.

Figure 7B:
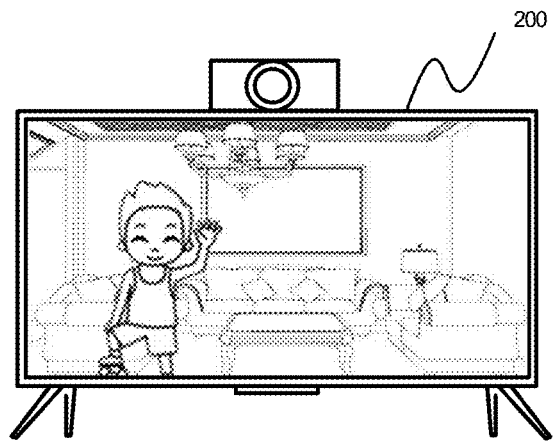
FIG. 7B illustrates a schematic diagram of an image of a display device according to an example embodiment of the disclosure.

For example, a "looking in mirror" function, that is, after a user turns on the camera, the camera will start to collect image data within its field of view, and the image data will be called back to the display device and rendered on a screen. Thus, the user may only watch the image captured by the camera on the screen, which is equivalent to looking in a mirror. FIG. 7B is a schematic diagram of an image shown on the display device when a user uses the "looking in mirror" function. The image is a mirror image of a surrounding environment of the display device captured by the camera.

In addition, when the camera is installed on the display device, it may also provide a user with a "chatting while watching" function, where "watching" refers to watching playing images, for example, dynamic images from a video, or, a static image, text and a UI from an application, while "chatting" refers to a video chat with at least one other user.

Figure 7C:
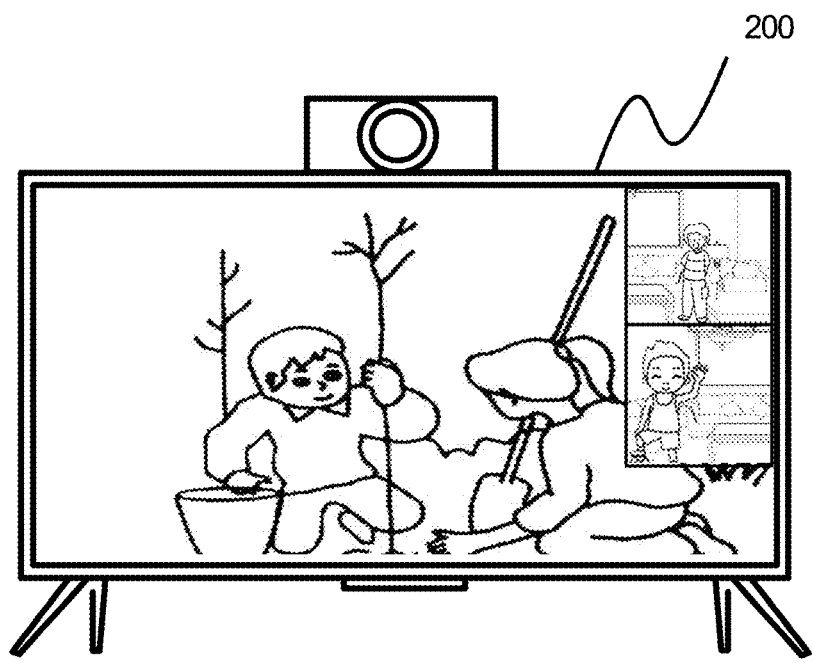
FIG. 7C is a schematic diagram of an image of a display device according to an example embodiment of the disclosure.

FIG. 7C is a schematic diagram of an image shown on the display device in a "chatting while watching" scenario. As shown in FIG. 7C, a user is in a video chat with two other users while watching a video. In this interface, a playing image of the video is used as background, and a video chat window is displayed above the playing image.

Figure 7D:
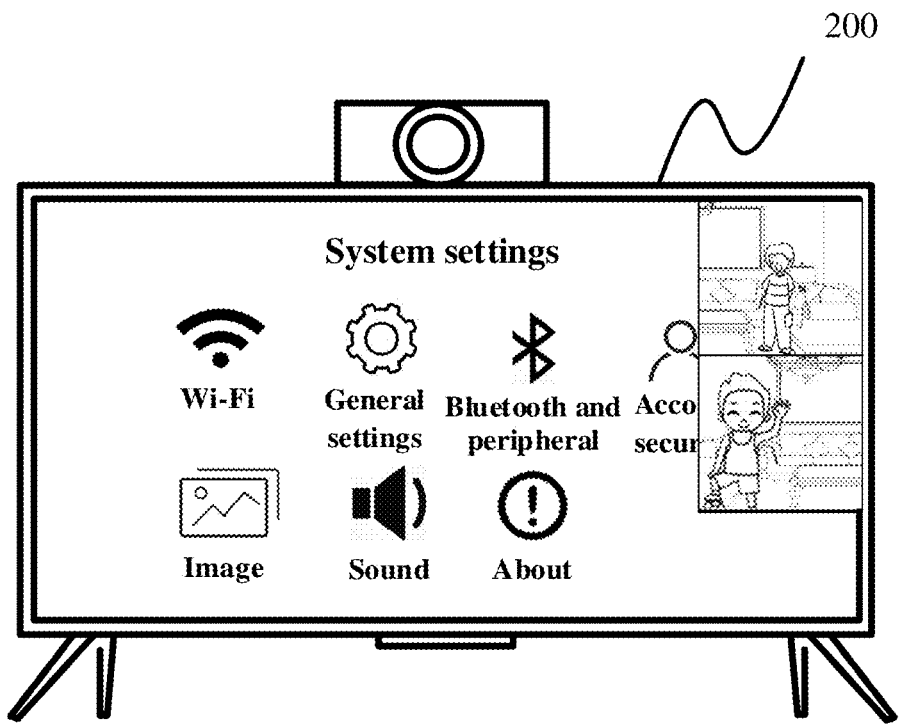
FIG. 7D is a schematic diagram of an image of a display device according to an example embodiment of the disclosure.

FIG. 7D is a schematic diagram of an image shown on the display device in another "chatting while watching" scenario. As shown in FIG. 7D, while watching a UI from a certain application, a user is in a video chat with three other users. In this interface, the UI (playing image) of the application is used as background, and the video chat window is displayed above the UI. To put that in another perspective, when the application is an educational application and the image shown on the display device is learning content in the educational application, the scenario may also be called as "chatting while learning". When the application is a game application and the image shown on the display device is a game image, the scenario may also be called as "chatting while playing".

It is noted that in the "chatting while watching" scenario, a position of the video chat window includes but not limited to positions shown in FIG. 7C and FIG. 7D. Alternatively, when the video chat is successfully connected and is switched to a small window, an initial position of the video chat window displayed on the playing image is a default position.

In the above scenarios, because the video chat window is on an layer above the playing image, when a user needs to operate the display device, a focus on the playing image may be blocked by the video chat window, so that the user cannot know where the focus is, or, if there is keyword information on the playing image, the keyword information may be blocked by the video chat window, thereby affecting view of the keyword information for the user. Among them, the keyword information is, for example, score information presented in a live sports match, or subtitle information presented in other live shows.

Figure 7E:
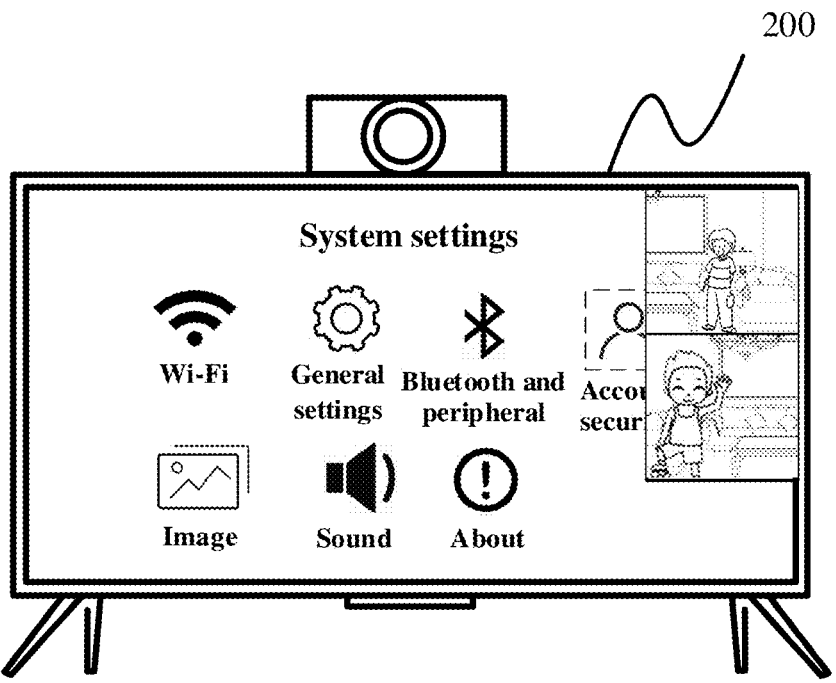
FIG. 7E is a schematic diagram of an image of a display device according to an example embodiment of the disclosure.

For example, FIG. 7E shows a scenario where a focus on the playing image is blocked by the video chat window, and a dotted frame is the focus blocked by the video chat window.

Figure 7F:
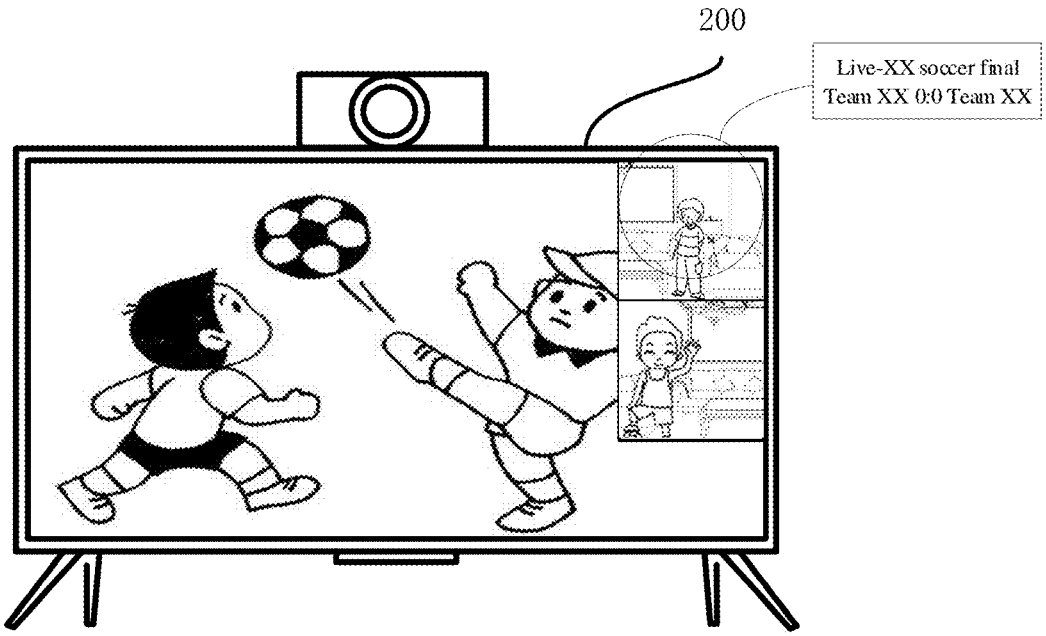
FIG. 7F is a schematic diagram of an image e of a display device according to an example embodiment of the disclosure.

For another example, FIG. 7F shows a scenario where the score information on the playing image is blocked by the video chat window.

In view of the above issue, in some embodiments, the controller of the display device (such as the above-mentioned first controller or the second controller) is configured to control to present the playing image on the display; in a video chat with one or more peer devices, one or more video chat windows are presented above the playing image, each video chat window is smaller than the playing image in size, i.e., a small window; when the controller receives an instruction for moving a focus input from the user, it acquires a position of the video chat window and a position of the focus, and determines whether the video chat window blocks the focus according to the position of the video chat window and the position of the focus; and if the video chat window blocks the focus, the controller controls the video chat window to move from a current position to a first target position, where the first target position is a position where the video chat window does not block the focus.

In this way, since the position of the video chat window moves accordingly based on the position of the focus, blocking a focus UI icon may be avoided. Even if the position of the focus keeps changing, the position of the video chat window will also change accordingly, so the focus UI icon will not be blocked.

In some other embodiments, the controller of the display device (such as the above-mentioned first controller or the second controller) is configured to control to present the playing image on the display; in a video chat with at least one peer device, one or more video chat windows are presented above the playing image, each video chat window is smaller than the playing image, i.e., in the form of a small window; when the playing image includes a video image and there is keyword information in the video image, it acquires a position of the video chat window and a position of the keyword information, and determines whether the video chat window blocks the keyword information according to the position of the video chat window and position of the keyword information; and if the video chat window blocks the keyword information, the controller controls the video chat window to move from a current position to a second target position, wherein the second target position is a position where the video chat window does not block the keyword information.

In this way, since the position of the video chat window moves accordingly based on position of the keyword information, blocking the keyword information in the program image may be avoided.

According to the above embodiments, the disclosure further provides a method for adjusting a position of a video chat window. In the following embodiments of the method, a more specific embodiment is introduced. The subject for performing the method includes but not limited to a controller of a display device and modules connected to the controller. Through the method, in a "chatting while watching" scenario, the position of the video chat window is automatically adjusted according to focus position or keyword information position in a playing image, thereby preventing the video chat window from blocking the focus or keyword information.

Figure 8:
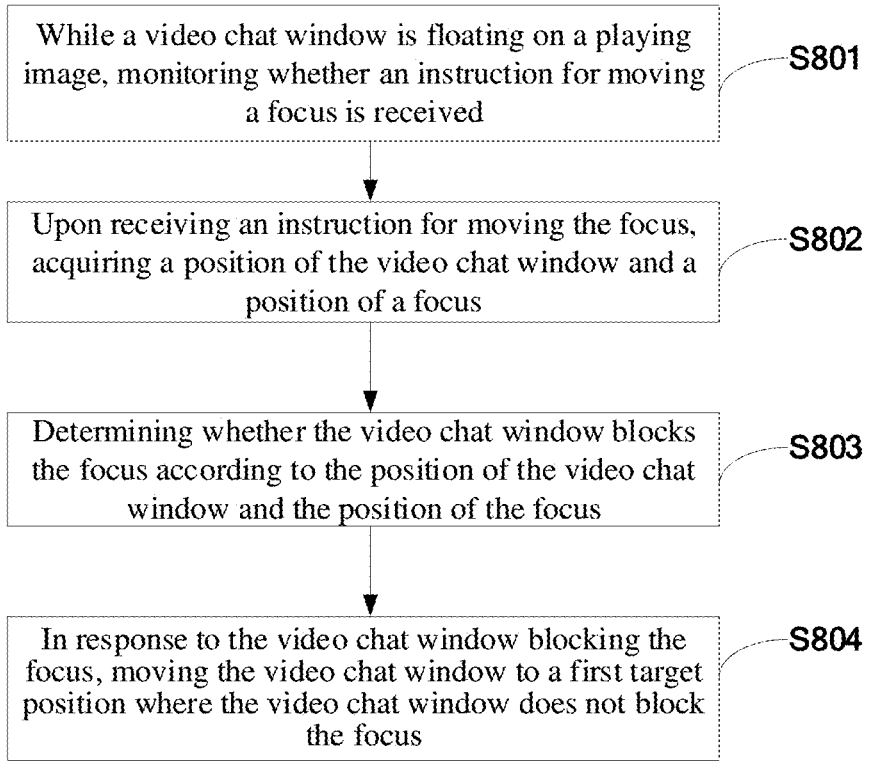
FIG. 8 is a flow diagram of a method for adjusting a position of a video chat window adaptively according to an example embodiment of the disclosure.

FIG. 8 is a flow diagram of a method for adjusting a position of the video chat window according to an example embodiment of the disclosure. As shown in FIG. 8, the method may include the following steps.

Step 801, while a video chat window is floating on a playing image, monitoring whether an instruction for moving a focus is received.

In a scenario, when a display device is presenting a playing image, a social application with a video chat function receives a video chat invitation from at least one friend, receives a user input for accepting the invitation, and establishes a video chat connection with the friend. After the connection is established successfully, a video stream sent from a device of the friend is received, and the video stream is decoded and presented in the video chat window. The video chat window will float on a current playing image in a form of a small window.

In another scenario, when the display device is presenting a video chat image in a video chat window, and the video chat window is a full-screen window, a user input for exiting from the full-screen window is received, a playing image will be presented as a background image, and at the same time, the video chat window is switched from the full-screen window to a small window, so that the video chat window in a form of a small window floats on the current playing image.

It should be noted that when a video chat window floats on a playing image shown on the display device, the playing image as the background may be a dynamic video image presented on a video layer, or a static UI presented on an OSD layer, or it may also be an image after the video layer and the OSD layer are superimposed.

In specific implementation, the display device monitors at least whether the above two scenarios appear, and when any one of the scenarios is monitored, it is determined that there is a video chat window floating on the playing image shown on the display device. Specifically, when the display device is presenting a playing image, whether a video chat window is opened is monitored, and if it is determined that the video chat window is opened, the video chat window floats on the playing image shown on the display device at the moment; and, if the video chat window is shown on the display device and the video chat window is in full screen, whether an instruction for exiting from full screen is received is monitored. If the instruction for exiting from the full screen is received, after the display device responds to the instruction and switch the video chat window to a small window, it is determined that there is a video chat window floating on the playing image shown on the display device.

In the embodiment, the initial position of the video chat window may be any position on the playing image. For example, the initial position of the video chat window is a preset default position. For example, as shown in FIG. 7D, a right side of a display screen, close to an edge of the screen is the initial position, when there are at least two video chat windows, the at least two video windows are arranged in a longitudinal direction in order.

In a scenario of the embodiment, the user may send an instruction for moving a focus to the display device through a remote control 100A or a control device 100B. For example, when the user presses a ">" (left) key on the remote control 100A, the remote control 100A will send key value data corresponding to ">" to the display device to instruct the display device to move the focus leftwards.

By displaying a focus UI icon (such as a focus frame or a cursor) on the user interface, a purpose of focus visualization is achieved. Usually, the focus frame or the cursor is displayed on the OSD layer. It should be noted that after the display device is turned on, it may always receive instructions for moving the focus input from the user through the control device 100.

Step 802, upon receiving an instruction for moving the focus, acquiring a position of the video chat window and a position of a focus.

In specific implementation of step 802, coordinates of a non-edge corner of the video chat window may be acquired, and a current position of the video chat window is determined according to the coordinates of the non-edge corner acquired, where the video chat window includes four corners and the four corners at least include one non-edge corner.

Figure 9A:
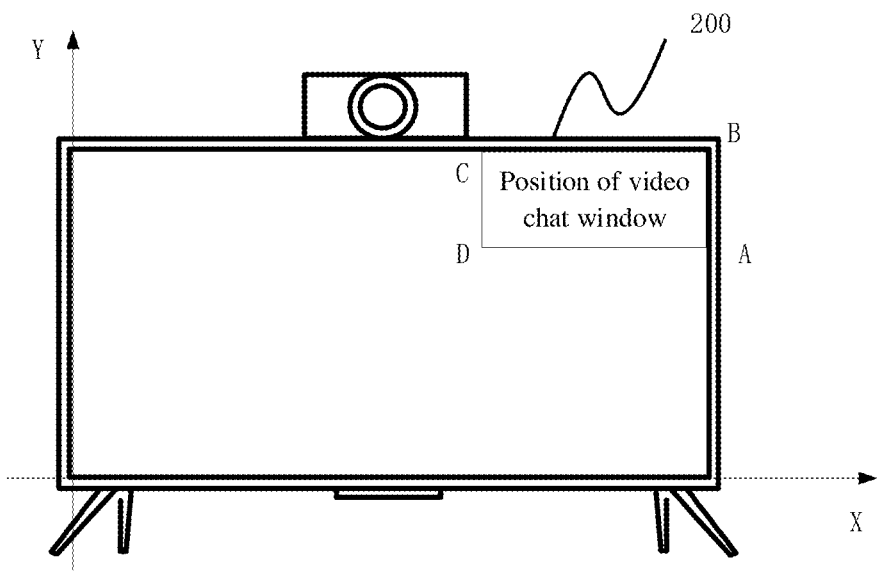
FIG. 9A is a schematic diagram of a position of a video chat window according to an example embodiment of the disclosure.

As shown in FIG. 9A, the video chat window is a rectangle ABCD, where □A, □B, and □C are edge corners, vertices of the edge corners coincide with edges of the display screen, □D is a non-edge corner and a vertex of the non-edge corner does not coincide with the edges of the display screen. FIG. 9A, FIG. 9B, FIG. 9C and FIG. 9D respectively show a situation where the video chat window includes only one non-edge corner.

Figure 10A:
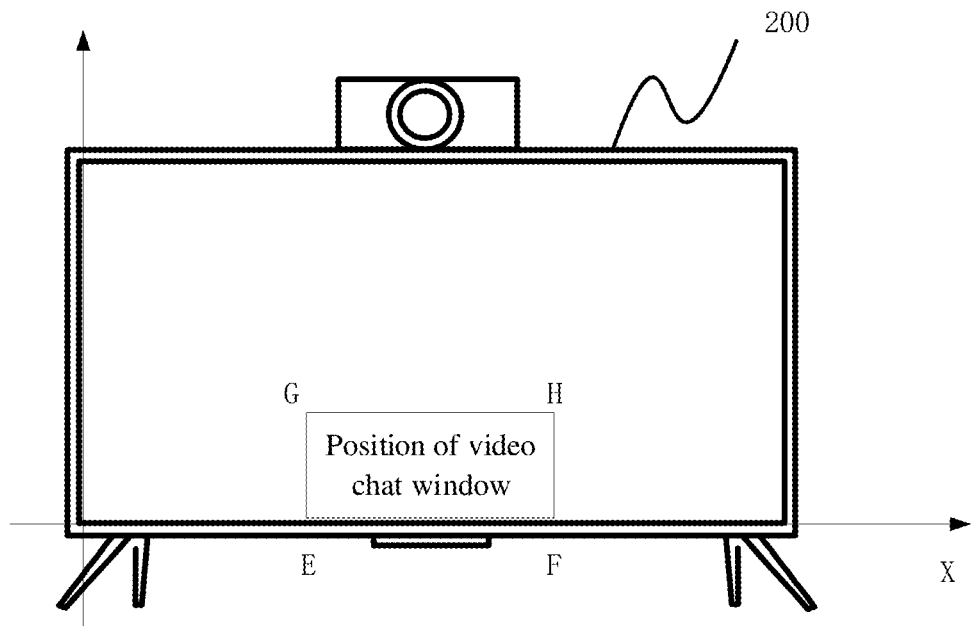
FIG. 10A is a schematic diagram of a position of a video chat window according to an example embodiment of the disclosure.

As shown in FIG. 10A, the video chat window is a rectangle EFGH, where ∠E and ∠F are edge corners, and ∠G and ∠H are non-edge corners, FIG. 10A, FIG. 10B, FIG. 10C, and FIG. 10D respectively show a situation where the video chat window includes two non-edge corners.

In a scenario, the video chat window floats on the playing image and is displayed close to the edges of the screen. Therefore, there is at least one non-edge corner and at most two non-edge corners. By obtaining the coordinates of the non-edge corner of the video chat window, the position of the video chat window may be determined.

For example, when the coordinates of the only one non-edge corner (X1, Y1) of the video chat window is acquired, since the video chat window has only one non-edge corner, it may be determined that coordinates of remaining three edge corners are (0, 0), (0, Y1), (X1, 0) respectively. Further, the video chat window is located in a rectangular region formed by points (0, 0), (0, Y1), (X1, 0), (X1, Y1), as shown in FIG. FIG. 9A, FIG. 9B, FIG. 9C and FIG. 9D.

Figure 10B:
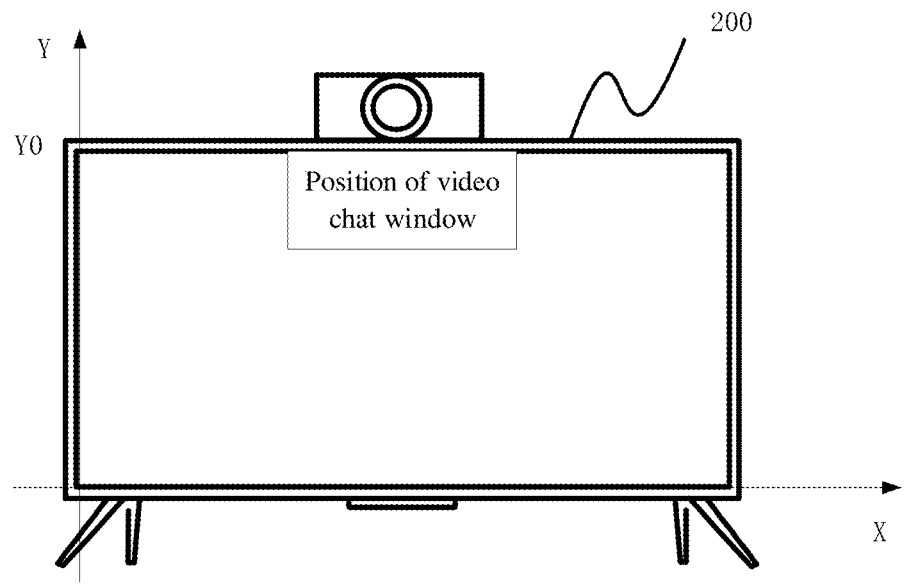
FIG. 10B is a schematic diagram of a position of a video chat window according to an example embodiment of the disclosure.

For another example, when coordinates of the two non-edge corners (X1, Y1) and (X2, Y1) of the video chat window are acquired: if Y1 is smaller than Y0, it may be determined that coordinates of the remaining two edge corners are (X1, 0) and (X2, 0) respectively, and further, the video chat window is located in a rectangular region formed by points (X1, Y1), (X2, Y1), (X1, 0) and (X2, 0), as shown in FIG. 10A; and if Y1 is greater than Y0, it may be determined that coordinates of the remaining two edge corners are (X1, Ymax) and (X2, Ymax) respectively, and further, the video chat window is located in a rectangular region formed by points (X1, Y1), (X2, Y1), (X1, Ymax) and (X2, Ymax), as shown in FIG. 10B.

Figure 10C:
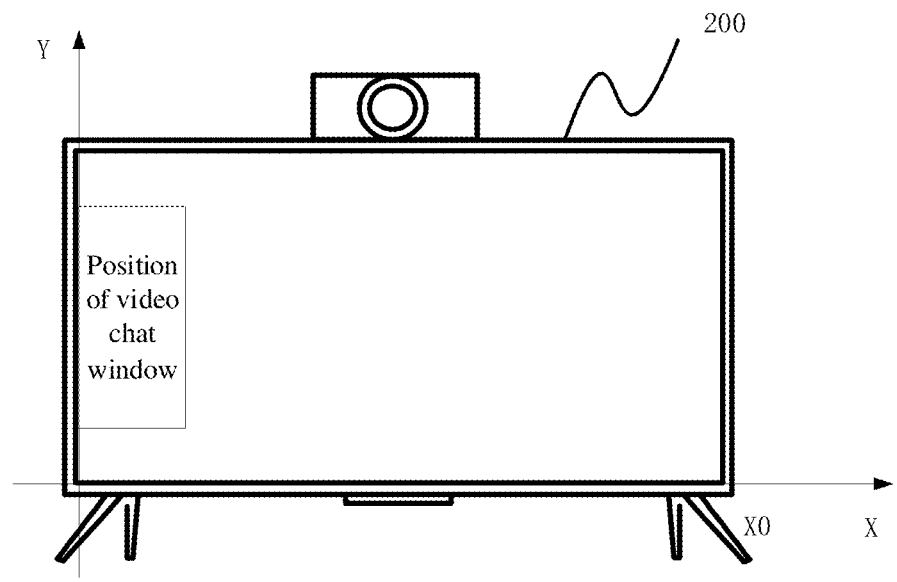
FIG. 10C is a schematic diagram of a position of a video chat window according to an example embodiment of the disclosure.
Figure 10D:
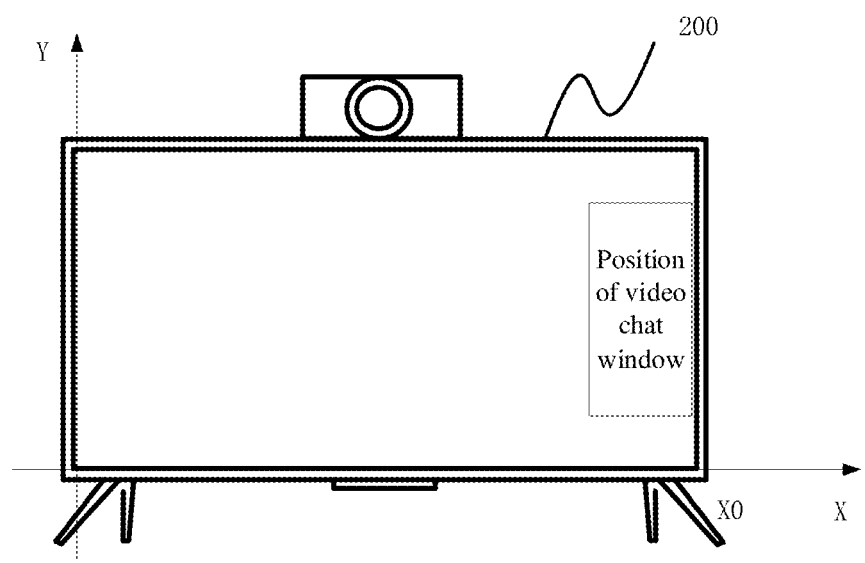
FIG. 10D is a schematic diagram of a position of a video chat window according to an example embodiment of the disclosure.

For another example, when coordinates of the two non-edge corners (X1, Y1) and (X1, Y2) of the video chat window are acquired: if X1 is smaller than X0, it may be determined that coordinates of the remaining two edge corners are (0, Y1) and (0, Y2) respectively, and further, the video chat window is located in a rectangular region formed by points (X1, Y1), (X1, Y2), (0, Y1) and (0, Y2), as shown in FIG. 10C; and if X1 is greater than X0, it may be determined that coordinates of the remaining two edge corners are (Xmax, Y1) and (Xmax, Y2) respectively and further, the video chat window is located in a rectangular region formed by points (X1, Y1), (X1, Y2), (Xmax, Y1) and (Xmax, Y2), as shown in FIG. 10D.

In step 802, when the display device receives the instruction for moving the focus, coordinates of the position of the focus is acquired. For those skilled in the art, there are many related techniques for acquiring the position of the focus, and details will omit herein.

Step 803, determining whether the video chat window blocks the focus according to the position of the video chat window and the position of the focus.

In specific implementations, whether coordinates of the focus is located in the rectangular region corresponding to the video chat window will be determined. If yes, it is determined that the video chat window blocks the focus, and if not, it is determined that the video chat window does not block the focus.

Step 804, in response to the video chat window blocking the focus, moving the video chat window to a first target position where the video chat window does not block the focus.

Figure 11:
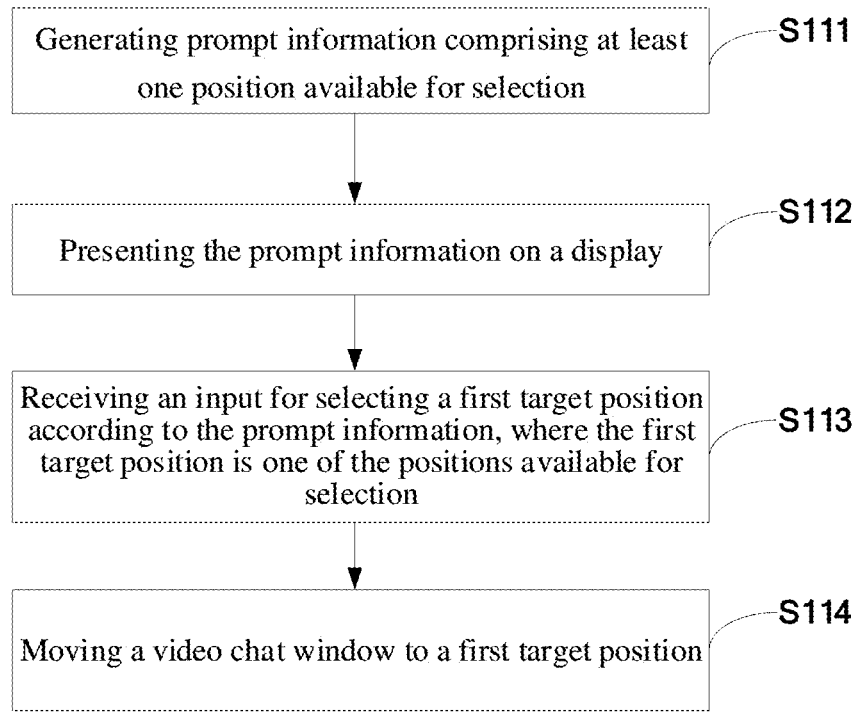
FIG. 11 is a detailed flow diagram of step 804 in the embodiment illustrated in FIG. 8 of the disclosure.

As an implementation, step 804 may further include steps shown in FIG. 11.

Step 111, generating prompt information comprising at least one position available for selection.

Alternatively, before step 111, at least two positions are preset for the video chat window, and when the video chat window floats on the playing image, it is displayed at one of the preset positions. Furthermore, one of the at least two preset positions is selected in advance as a default position, and when the video chat window floats on the playing image, it is displayed at the default position.

In specific implementation, at least one position available for selection is first determined. The position available for selection may be any one or more of the preset positions for the video chat window. A display region corresponding to the position available for selection needs to not block the position of the focus at the current moment. Then the prompt information is generated based on information of the position.

It should be noted that the prompt information may be an interface prompt or a voice prompt, and output content of the voice prompt is a text description of the position for selection.

Step 112, presenting the prompt information on the display.

Step 113, receiving an input for selecting a first target position according to the prompt information, where the first target position is one of the positions available for selection.

Figure 12:
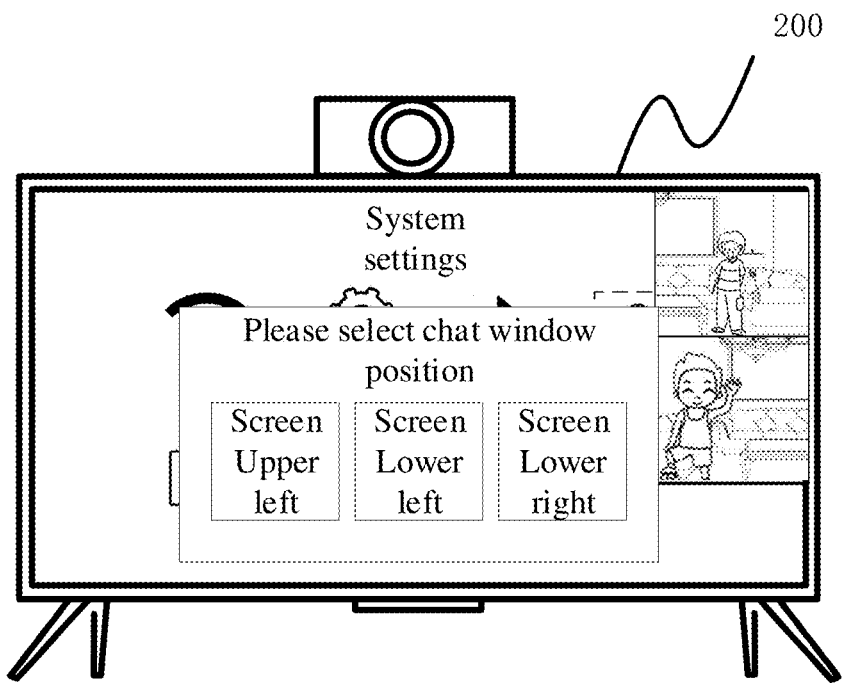
FIG. 12 is a schematic diagram of a display device interface including prompt information according to an example embodiment of the disclosure.

For example, FIG. 12 is a simple schematic diagram of the above-mentioned prompt information as an interface prompt. As shown in FIG. 12, the interface prompt pops up on the display. The interface prompt includes 3 positions available for selection, and each position corresponds to an interface control. A user may control, through the control device 100, a focus to move among the 3 positions, and finally select one of the positions as a first target position.

Step 114, moving the video chat window to the first target position.

Figure 13:
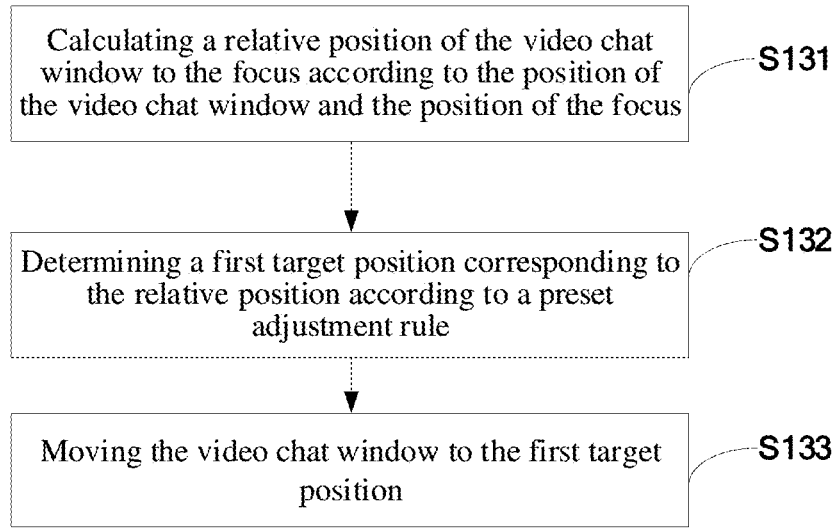
FIG. 13 is another detailed flow diagram of step 804 in the embodiment shown in FIG. 8 of the disclosure.

As another implementation, step 804 may further include steps shown in FIG. 13.

Step 131, calculating a relative position of the video chat window to the focus according to the position of the video chat window and the position of the focus.

Assuming that the coordinates of the only one non-edge corner of the video chat window obtained in step 801 is (Xc, Yc), and the coordinates of the focus is (Xf, Yf), the relative positions of the two may be calculated by the following algorithm.

Figure 9B:
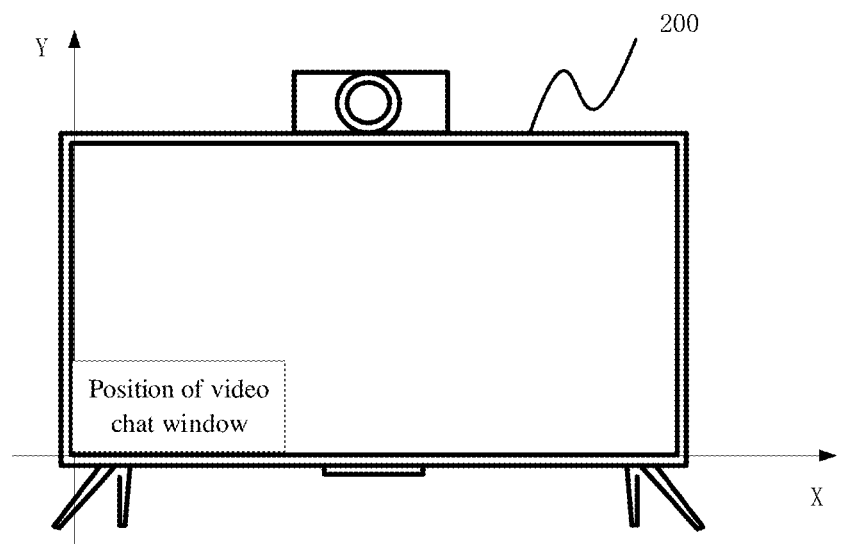
FIG. 9B is a schematic diagram of a position of a video chat window according to an example embodiment of the disclosure.
Figure 9C:
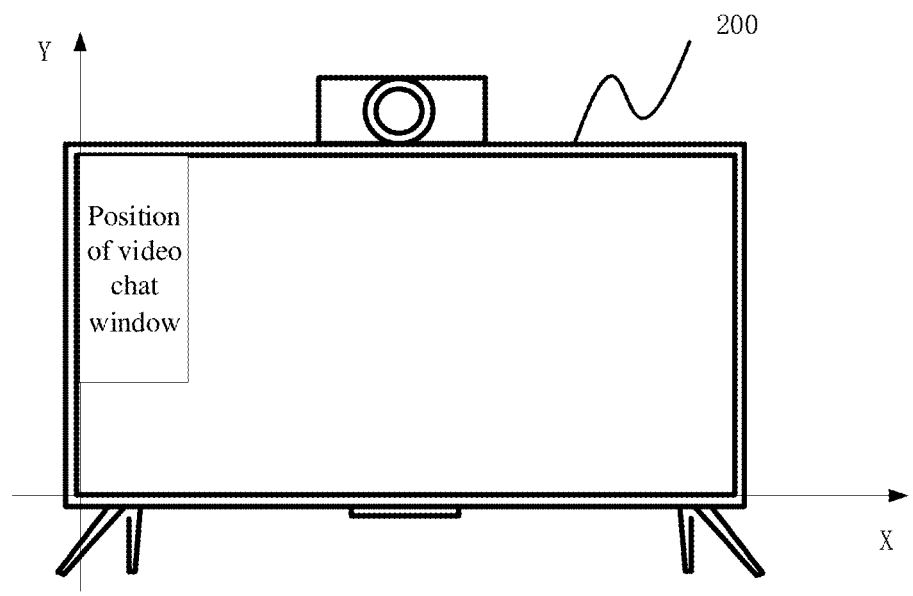
FIG. 9C is a schematic diagram of a position of a video chat window according to an example embodiment of the disclosure.
Figure 9D:
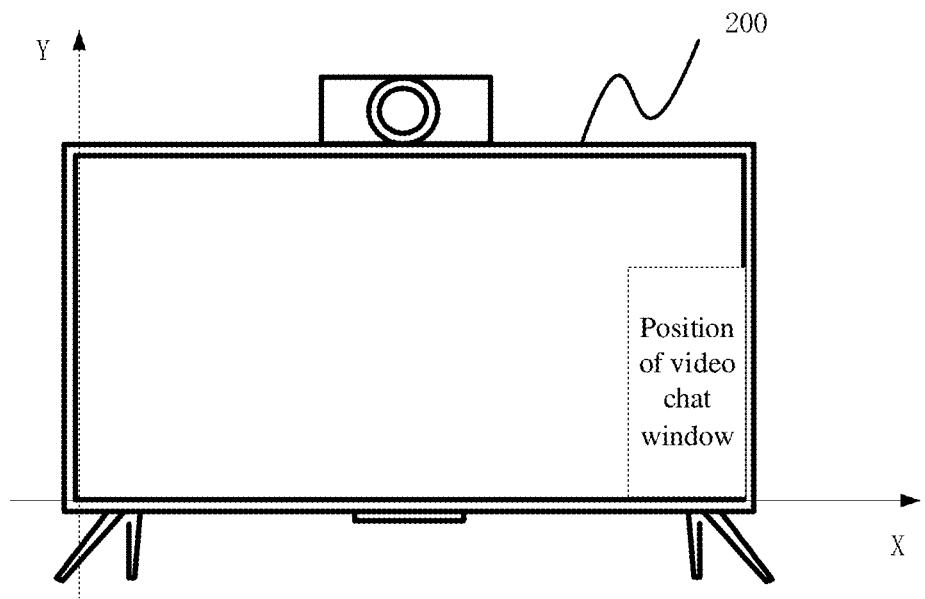
FIG. 9D is a schematic diagram of a position of a video chat window according to an example embodiment of the disclosure.

Xf and Xc, and Yf and Yc are compared respectively, and in the following situations, the video chat window blocks the focus, if Xf>Xc and Yf>Yc, it means that the video chat window is at a position shown in FIG. 9A, and the focus is at the upper right of the non-edge corner;

if Xf<Xc and Yf<Yc, it means that the video chat window is at a position shown in FIG. 9B, and the focus is at the bottom left of the non-edge corner;

if Xf<Xc and Yf>Yc, it means that the video chat window is located at a position shown in FIG. 9C, and the focus is on the upper left of the non-edge corner; and if Xf<Xc and Yf<Yc, it means that the video chat window is located at a position shown in FIG. 9D, and the focus is located at the lower right of the non-edge corner.

Step 132, determining a first target position corresponding to the relative position according to a preset adjustment rule.

According to a calculation result in step 131, for example, an optional preset adjustment rule is as follows.

If Xf>Xc and Yf>Yc, it is determined that the position shown in FIG. 9B is the first target position.

If Xf<Xc and Yf<Yc, it is determined that the position shown in FIG. 9A is the first target position.

If Xf<Xc and Yf>Yc, it is determined that the position shown in FIG. 9D is the first target position.

If Xf<Xc and Yf<Yc, it is determined that the position shown in FIG. 9C is the first target position.

Step 133, moving the video chat window to the first target position.

Figure 14:
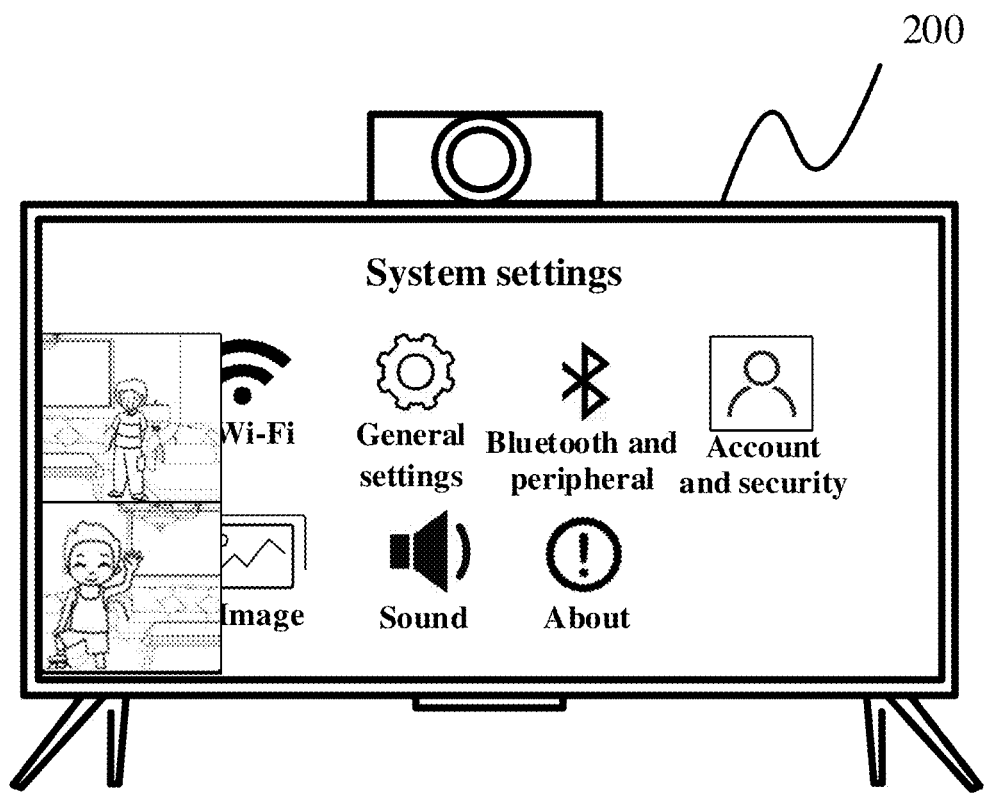
FIG. 14 is a schematic diagram of an image of a display device according to an example embodiment of the disclosure.

FIG. 14 is a schematic diagram of an interface after moving a video chat window. As shown in FIG. 14, the video chat window after being moved no longer blocks the focus.

It can be seen that the embodiments of the disclosure provides a method for adjusting the position of the video chat window. When the video chat window is floating on the playing image, whether an instruction for moving a focus is received is monitored; when the instruction for moving the focus is received, the position of the video chat window and the position of the focus are acquired; whether the video chat window blocks the focus is determined according to the position of the video chat window and the position of the focus; and if it is determined that the video chat window blocks the focus, the video chat window is moved from a current position to a first target position. Through the method in the disclosure, since the position of the video chat window is moved accordingly based on the position of the focus, blocking a focus UI icon may be avoided. Even if the position of the focus keeps changing, the position of the video chat window will also change correspondingly, so the focus UI icon will not be blocked.

In fact, when a video chat window floats on the playing image, the video chat window may not only block a focus, but also block keyword information if there is the keyword information on the playing image, thereby affecting view of the keyword information for a user. The keyword information is, for example, score information shown in live sports match, or subtitle information shown in other live shows.

Therefore, in view of the issues such as the video chat window blocks the keyword information on the playing image, the method for adjusting a position of the video chat window in this disclosure further provides the following embodiments.

Figure 15:
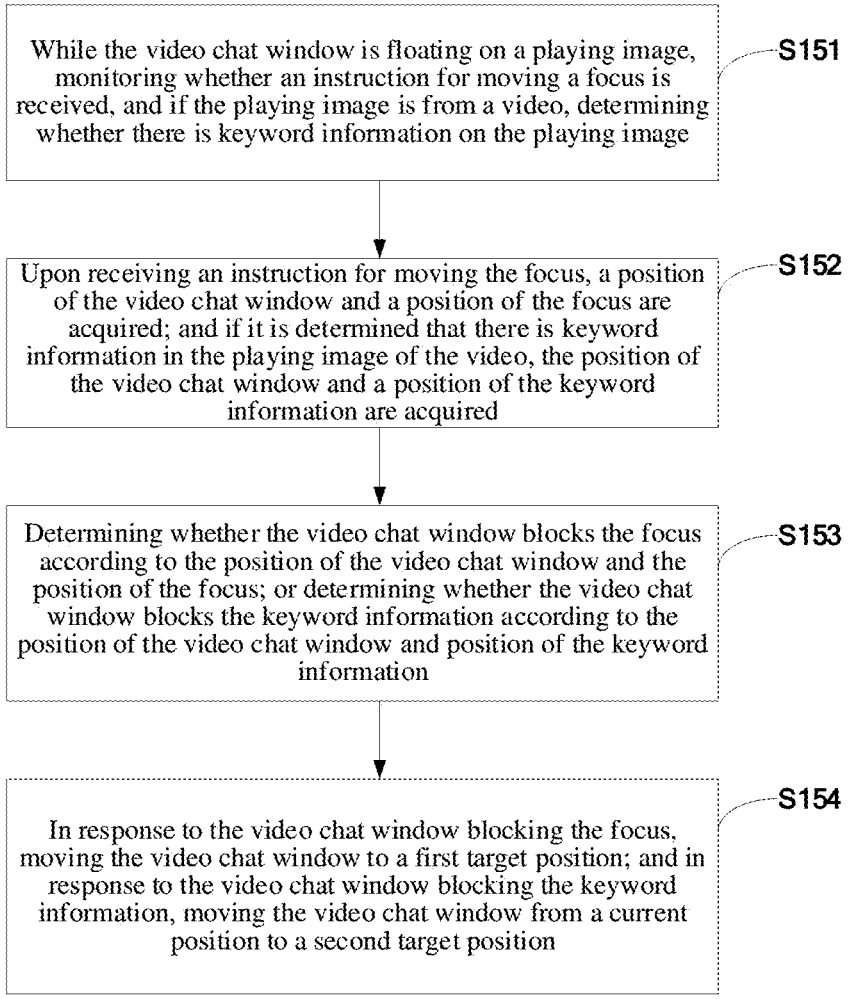
FIG. 15 is a flow diagram of a method for adjusting a position of a video chat window of a display device adaptively according to an example embodiment of the disclosure.

With reference to FIG. 15, a method for adjusting a position of a video chat window of a display device adaptively may include the following steps.

Step 151, while the video chat window is floating on a playing image, monitoring whether an instruction for moving a focus is received, and if the playing image is from a video, determining whether there is keyword information on the playing image.

It should be noted that, in step 151, there are at least two implementation methods as follows on how to determine whether there is keyword information on the playing image.

As an alternative implementation, at least one frame of the video is acquired, and then an image recognition technology based on a neural network model is used for recognizing a scene type. If it is recognized as a live show, keywords in the video frame are further detected to determine whether there is the keyword information.

As another alternative implementation, continuous N frames of the video within a preset time period are acquired, and then text information in each frame of the video is directly recognized, and according to a recognition result corresponding to each frame of the video, whether there is keyword information in the video is determined. For example, if it is determined that there is continuous changing text information in the video by comparing recognition results corresponding to the respective frames, the continuous changing text information is determined as keyword information. It may be score information in live broadcast event, and it may also be subtitle information in other shows.

Step 152, upon receiving an instruction for moving the focus, a position of the video chat window and a position of the focus are acquired; and if it is determined that there is keyword information in the playing image of the video, the position of the video chat window and a position of the keyword information are acquired.

In the embodiment, position of the keyword information is generally a region on the display screen. In different scenarios, the position of the keyword information may change, and a size of the position region may change as well. It should be noted that when it is determined that there is keyword information in the playing image, how to determine the region of the keyword information can refer to prior art and will omit here.

Figure 16A:
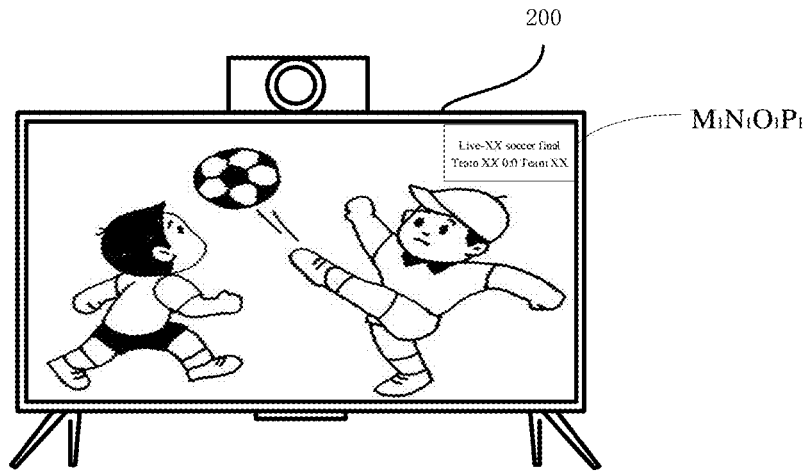
FIG. 16A is a schematic diagram of keyword information and a position illustrated according to an example embodiment of the disclosure.

For example, in FIG. 16A, the keyword information is located in a rectangular region M1N1O1P1.

Figure 16B:
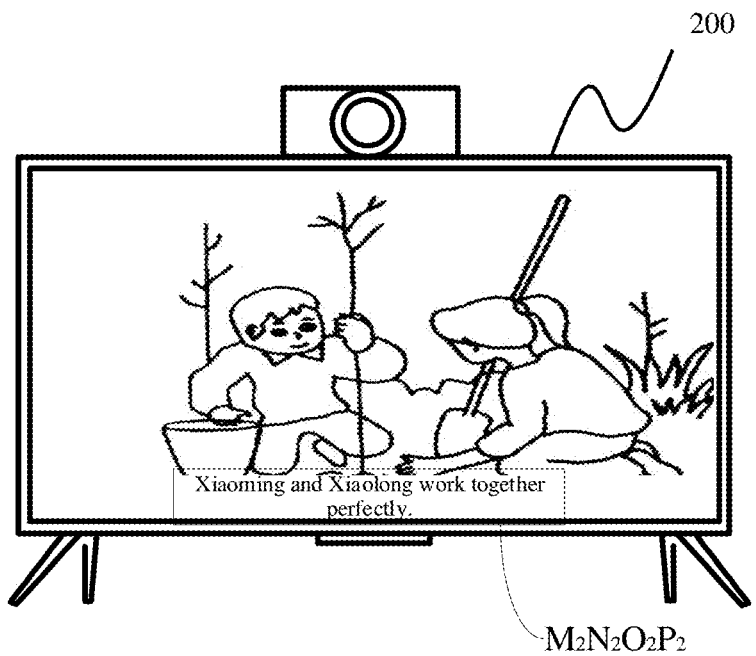
FIG. 16B is a schematic diagram of a position of a video chat window according to an example embodiment of the disclosure.

For another example, in FIG. 16B, the keyword information is located in a rectangular region M2N2O2P2.

Step 153, determining whether the video chat window blocks the focus according to the position of the video chat window and the position of the focus; or determining whether the video chat window blocks the keyword information according to the position of the video chat window and position of the keyword information.

In specific implementations, for the focus, whether coordinates of the focus is located in the rectangular region corresponding to the video chat window is determined; if yes, it is determined that the video chat window blocks the focus; and if not, it is determined that the video chat window does not block the focus. For the keyword information, whether a position region of the keyword information coincides with the rectangular region corresponding to the video chat window is determined; if yes, it is determined that the video chat window blocks the keyword information; and if not, it is determined that the video chat window does not block the keyword information.

Step 154, in response to the video chat window blocking the focus, moving the video chat window to a first target position; and in response to the video chat window blocking the keyword information, moving the video chat window from a current position to a second target position, where the second target position is a position where the video chat window does not block the keyword information.

It should be noted that the first target position and the second target position may be the same position or different positions. In fact, the first target position and the second target may be any position different from the current position of the video chat window.

Similar to specific implementation of step 804 in the above-mentioned embodiment, in step 154, if it is determined that the video chat window blocks the keyword information, the moving the video chat window from the current position to the second target position may include the following steps.

Firstly, prompt information including at least one position available for selection is generated. In particular, the at least one position available for selection is first determined, where the position is a preset position for the video chat window and a display region corresponding to the position available for selection does not block the focus and/or the keyword information; and then the prompt information is generated according to the positions available for selection.

Secondly, the prompt information is presented on the display.

Then, an input for selecting a second target position according to the prompt information is received, where the second target position is any one of the positions available for selection.

Finally, the video chat window is moved to the second target position.

In another embodiment, in step 154, if it is determined that the video chat window blocks the keyword information, the moving the video chat window from the current position to the second target position may include the following steps.

Firstly, a relative position of the video chat window to the keyword information is calculated according to the current position of the video chat window and a position of the keyword information.

Then, the second target position corresponding to the relative position is determined according to a preset adjustment rule.

Finally, the video chat window is moved to the second target position.

It can be seen from the above embodiments that the method for adjusting the position of the video chat window according to the disclosure can not only solve the problem that the video chat window blocks a focus UI icon, but also solve the problem of blocking the keyword information on the playing image. To be specific, when the playing image is from a video, whether there is the keyword information in the playing image is detected; if there is keyword information in the playing image, the position of the video chat window and position of the keyword information are acquired; whether the video chat window block the keyword information is determined according to the position of the video chat window and position of the keyword information; and if it is determined that the video chat window blocks the keyword information, the video chat window is moved from a current position to a second target location.

In addition, in order to enable the display device to meet individual needs of the user, in another embodiment of the disclosure, the user may independently move the position of the video chat window. In particular, in the method of the disclosure, a controller of the display device further performs: detecting whether an instruction for moving the video chat window is received; upon receiving the instruction for moving the video chat window, according to the instruction for moving the video chat window, moving the video chat window from a current position to a third target position.

The third target position, the first target position and the second target position may be the same position or different positions. In fact, the third target position may be any position different from the current position of the video chat window.

Figure 17:
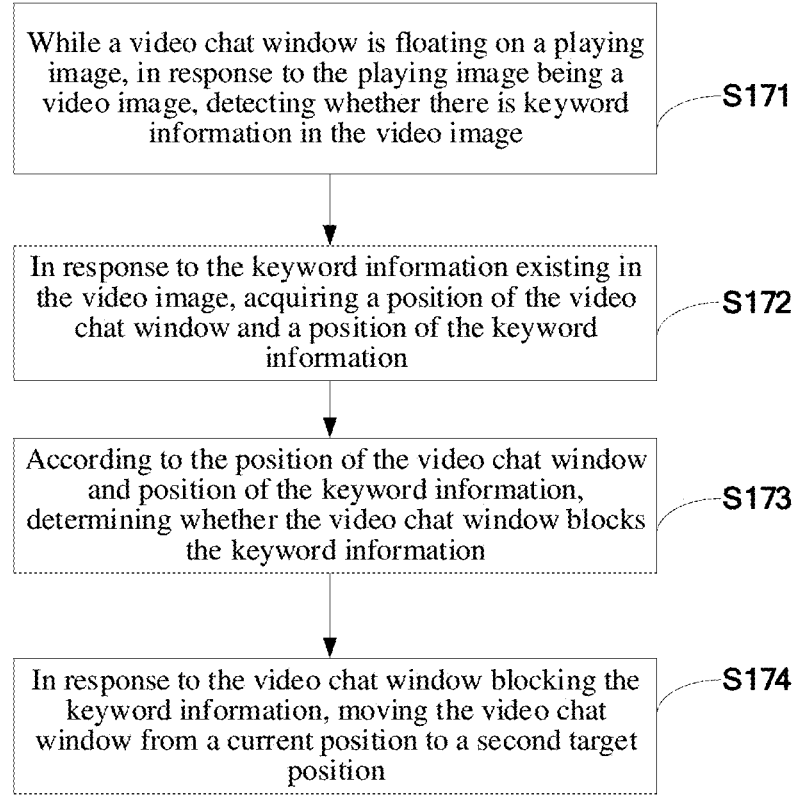
FIG. 17 is a flow diagram of a method for adjusting a position of a video chat window according to an example embodiment of the disclosure.

Based on the method for adjusting the position of the video chat window according to the embodiments of the disclosure, the disclosure further provides another method for adjusting a position of a video chat window. FIG. 17 is a flow diagram of an embodiment of the method. As shown in FIG. 17, the method may include the following steps.

Step 171, while a video chat window is floating on a playing image, in response to the playing image being a video image, detecting whether there is keyword information in the video image.

Step 172, in response to the keyword information existing in the video image, acquiring a position of the video chat window and a position of the keyword information.

Step 173, according to the position of the video chat window and position of the keyword information, determining whether the video chat window blocks the keyword information.

Step 174, in response to the video chat window blocking the keyword information, moving the video chat window from a current position to a second target position, where the second target position is a position where the video chat window does not block the keyword information.

For specific embodiments shown in FIG. 17, reference may be made to other embodiments of the disclosure, which will omit here.

It can be seen from the above embodiments that the method for adjusting the position of the video chat window while the video chat window floats on the image, if the playing image is a video image, whether there is keyword information in the video image is detected; when it is detected that there is keyword information in the video image, the position of the video chat window and position of the keyword information are acquired; according to the position of the video chat window and position of the keyword information, whether the video chat window blocks the keyword information is determined; and if it is determined that the video chat window blocks the keyword information, the video chat window is moved from a current position to a second target position. According to the method in this disclosure, since the position of the video chat window moves accordingly based on a position of the keyword information, blocking the keyword information may be avoided. Even if the position of the keyword information changes, the position of the video chat window will also change accordingly, so the keyword information will not be blocked.

In specific implementations, the disclosure further provides a computer-readable non-versatile storage medium, where the computer storage medium may store instructions, and a part of or all steps of the method according to the disclosure are performed when the instructions are executed. The storage medium may be a magnetic disk, an optical disc, a read-only memory (ROM), or a random access memory (RAM), etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display device, comprising:
a display, configured to display a playing image and/or a video chat window; and
a controller, configured to:
present the playing image;
during a video chat with a peer device, present the video chat window above the playing image, wherein the video chat window is smaller than the playing image in size;
upon receiving an instruction for moving a focus, acquire a position of the video chat window and a position of the focus, and determine, according to the position of the video chat window and the position of the focus, whether the video chat window blocks the focus; and
in response to the video chat window blocking the focus, move the video chat window from a current position to a first target position, wherein the first target position is a position where the video chat window does not block the focus.

2. The display device according to claim 1, wherein the controller is further configured to:
before the position of the video chat window and the position of the focus are acquired, while the video chat window is floating on the playing image, monitor whether the instruction for moving the focus is received.

3. The display device according to claim 1, wherein the controller is further configured to move the video chat window to the first target position by:
generating prompt information that comprises at least one position available for selection;
presenting the prompt information on the display;
receiving an input for selecting a first target position according to the prompt information, wherein the first target position is one of the at least one position; and
moving the video chat window to the first target position.

4. The display device according to claim 3, wherein the controller is further configured to generate the prompt information that comprises at least one position available for selection by:
determining the at least one position available for selection, wherein the at least one position is a preset position for the video chat window and a display region corresponding to the preset position does not block the focus; and
generating the prompt information according to the at least one position available for selection.

5. The display device according to claim 1, wherein the controller is further configured to move the video chat window to the first target position by:
calculating a relative position of the video chat window to the focus according to the position of the video chat window and the position of the focus;
determining the first target position corresponding to the relative position according to a preset adjustment rule; and
moving the video chat window to the first target position.

6. The display device according to claim 1, wherein the controller is further configured to acquire the position of the video chat window by:

acquiring coordinates of a non-edge corner of the video chat window, wherein the video chat window comprises four corners comprising at least one non-edge corner; and determining a position of the video chat window according to the acquired coordinates of the non-edge corner.

7. The display device according to claim 1, wherein the controller is further configured to:

in response to the playing image being a video image, detect whether there is keyword information in the video image;

in response to the keyword information existing in the video image, acquire the position of the video chat window and a position of the keyword information;

determine, according to the position of the video chat window and position of the keyword information, whether the video chat window blocks the keyword information; and in response to the video chat window blocking the keyword information, move the video chat window from a current position to a second target position, wherein the second target position is a position where the video chat window does not block the keyword information.

8. The display device according to claim 1, wherein the controller is further configured to:

detect whether an instruction for moving the video chat window is received; and in response to receiving the instruction for moving the video chat window, move the video chat window from a current position to a third target position according to the instruction for moving the video chat window.

9. A method for adjusting a position of a video chat window, comprising:

presenting a playing image and/or a video chat window on a display of a display apparatus;

during a video chat with a peer device, presenting the video chat window above the playing image, wherein the video chat window is smaller than the playing image in size;

upon receiving an instruction for moving a focus, acquiring a position of the video chat window and a position of the focus, and determining, according to the position of the video chat window and the position of the focus, whether the video chat window blocks the focus; and in response to the video chat window blocking the focus, moving the video chat window from a current position to a first target position, wherein the first target position is a position where the video chat window does not block the focus.

10. The method according to claim 9, further comprising:

before the position of the video chat window and the position of the focus are acquired, while the video chat window is floating on the playing image, monitoring whether the instruction for moving the focus is received.

11. The method according to claim 9, further comprising:

generating prompt information that comprises at least one position available for selection;

presenting the prompt information on the display;

receiving an input for selecting a first target position according to the prompt information, wherein the first target position is one of the at least one position; and moving the video chat window to the first target position.

12. The method according to claim 11, further comprising:

determining the at least one position available for selection, wherein the at least one position is a preset position for the video chat window and a display region corresponding to the preset position does not block the focus; and generating the prompt information according to the at least one position available for selection.

13. The method according to claim 9, further comprising:

calculating a relative position of the video chat window to the focus according to the position of the video chat window and the position of the focus;

determining the first target position corresponding to the relative position according to a preset adjustment rule; and moving the video chat window to the first target position.

14. The method according to claim 9, further comprising:

acquiring coordinates of a non-edge corner of the video chat window, wherein the video chat window comprises four corners comprising at least one non-edge corner; and determining a position of the video chat window according to the acquired coordinates of the non-edge corner.

15. The method according to claim 9, further comprising:

in response to the playing image being a video image, detecting whether there is keyword information in the video image;

in response to the keyword information existing in the video image, acquiring the position of the video chat window and a position of the keyword information;

determining, according to the position of the video chat window and position of the keyword information, whether the video chat window blocks the keyword information; and in response to the video chat window blocking the keyword information, moving the video chat window from a current position to a second target position, wherein the second target position is a position where the video chat window does not block the keyword information.

16. The method according to claim 9, further comprising:

detecting whether an instruction for moving the video chat window is received; and in response to receiving the instruction for moving the video chat window, moving the video chat window from a current position to a third target position according to the instruction for moving the video chat window.

\* \* \* \* \*